(12) United States Patent
Banerjee et al.

(10) Patent No.: US 11,269,657 B2
(45) Date of Patent: Mar. 8, 2022

(54) SYSTEM AND METHOD FOR IDENTIFYING STALE SOFTWARE-DEFINED NETWORK COMPONENT CONFIGURATIONS

(71) Applicant: VMWARE, INC., Palo Alto, CA (US)

(72) Inventors: Sujeet Banerjee, Bangalore (IN); Umar Shaikh, Bangalore (IN); Amarjeet Singh, Bangalore (IN); Vishnu Kanth Tadipaneni, Bangalore (IN); Sureshbabu Koyadan Chathoth, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 217 days.

(21) Appl. No.: 16/591,662

(22) Filed: Oct. 3, 2019

(65) Prior Publication Data
US 2021/0026655 A1 Jan. 28, 2021

(30) Foreign Application Priority Data
Jul. 24, 2019 (IN) .............................. 201941029992

(51) Int. Cl.
| | | |
|---|---|---|
| G06F 9/445 | (2018.01) | |
| H04L 12/24 | (2006.01) | |
| G06F 16/28 | (2019.01) | |
| H04L 41/00 | (2022.01) | |
| H04L 41/0806 | (2022.01) | |

(52) U.S. Cl.
CPC ........ *G06F 9/44505* (2013.01); *G06F 16/285* (2019.01); *H04L 41/0806* (2013.01); *H04L 41/20* (2013.01)

(58) Field of Classification Search
CPC ..... H04L 67/34; H04L 41/0806; H04L 67/06; H04L 67/42; H04L 63/20; H04L 41/0816; H04L 67/1002; G06F 9/44505; G06F 16/13; G06F 16/183; G06F 3/0488; G06F 9/4416
See application file for complete search history.

(56) References Cited

U.S. PATENT DOCUMENTS

| | | | |
|---|---|---|---|
| 6,756,994 B1 | 6/2004 | Tlaskal | |
| 7,653,699 B1 * | 1/2010 | Colgrove | ................ G06F 16/10 709/213 |
| 8,601,542 B1 * | 12/2013 | Eatough | .............. G06F 9/44505 726/3 |

(Continued)

OTHER PUBLICATIONS

Wikipedia, "Software-defined networking", https://en.wikipedia.org/wiki/Software-defined networking, retrieved Jun. 1, 2020, 7 pgs.

(Continued)

*Primary Examiner* — Michael A Keller
*Assistant Examiner* — Thao D Duong
(74) *Attorney, Agent, or Firm* — Loza & Loza, LLP

(57) ABSTRACT

A computer-implemented system and method for identifying stale configurations of a software-defined network (SDN) component uses a configuration export file of the SDN component to generate configuration dependency strands for configurations of the SDN component. The configuration dependency strands can then be classified as being stale based on at least one of path length, reference count and a custom attribute to elements in a network infrastructure for the configuration dependency strands.

20 Claims, 21 Drawing Sheets

(56) References Cited

U.S. PATENT DOCUMENTS

| | | | |
|---|---|---|---|
| 9,762,450 | B2 | 9/2017 | Xie et al. |
| 10,547,521 | B1 | 1/2020 | Roy et al. |
| 10,924,346 | B1 | 2/2021 | Banerjee et al. |
| 2004/0268298 | A1* | 12/2004 | Miller ............... G06F 8/60 717/106 |
| 2008/0092036 | A1* | 4/2008 | Boffemmyer ......... G06F 16/258 715/234 |
| 2016/0357424 | A1 | 12/2016 | Pang et al. |
| 2016/0380807 | A1 | 12/2016 | Shevenell et al. |
| 2017/0123777 | A1 | 5/2017 | Mittal et al. |
| 2017/0250869 | A1 | 8/2017 | Voellmy |
| 2018/0034703 | A1 | 2/2018 | Anholt et al. |
| 2019/0052549 | A1 | 2/2019 | Duggal et al. |
| 2019/0230127 | A1 | 7/2019 | Gandham et al. |
| 2020/0142787 | A1* | 5/2020 | Thatikonda ......... G06F 11/2041 |
| 2020/0334068 | A1* | 10/2020 | Krishnamurthy ... G06F 11/3466 |

OTHER PUBLICATIONS

CISCO, "CIS—CISCO Switch backup and restore", https://www.cisco.com/c/en/us/support/docs/ios-nx-ossoftware/ios-software-releases-122-mainline/46741-backup-config.html, retrieved Jul. 1, 2020, updated Aug. 3, 2006, 7 pgs.

CISCO, "Using Templates to Configure Devices", Chapter 21, https://www.cisco.com/c/en/us/td/docs/net_mgmt/prime/infrastructure/3-1/user/guide/pi_ug/config-temp.pdf, retrieved Jul. 1, 2020, 78 pgs.

Vmware, "Network and Security Objects", https://docs.vmware.eom/en/VMware-NSX-Data-Center-for-vSphere/6.4/com.vmware.nsx.admin.doc/GUID-C0760D51-16F1-43B8-90D8-D39B47249157.html, retrieved Jul. 1, 2020, 2 pgs.

Vmware, "Working with Security Groups", https://docs.vmware.eom/en/VMware-NSX-Data-Center-for-vSphere/6.4/com.vmware.nsx.admin.doc/GUID-16B3134E-DDF1-445A-8646-BB0E98C3C9B5.html, retrieved Jul. 1, 2020, 2 pgs.

Vmware, "NSX-V 6.3: Cross-VC NSX Security Enhancements", https://blogs.vmware.com/networkvirtualization/2017/02/nsx-6-3-cross-vc-nsx-securityenhancements.html/, retrieved Jul. 1, 2020, 12 pgs.

Vmware, "NSX API Guide", https://docs.vmware.eom/en/VMware-NSX-Data-Center-for-vSphere/6.4/nsx_64_api.pdf, retrieved Jul. 1, 2020, 595 pgs.

Wikipedia, "Tree", https://en.wikipedia.org/wiki/Tree_(graph_theory), retrieved Jul. 1, 2020, 14 pgs.

Vmware, "Create an IP Address Group", https://docs.vmware.com/en/VMware-NSX-Data-Center-for-vSphere/6.4/com.vmware.nsx.admin.doc/GUID-D90798B6-C3AF-417D-B23C-6BE5381201AA.html, retrievced Jul. 1, 2020, 2 pgs.

W3c, "XML Path Language (XPath)", Version 1.0, updated Oct. 2016, https://www.w3.org/TR/1999/REC-xpath-19991116/, 35 pgs.

Vmware, "Understanding VM snapshots in ESXI (1015180)", https://kb.vmware.com/s/article/1015180, retrieve Jul. 1, 2020, 5 pgs.

Juniper Networks, "Advanced Policy-Based Routing Configuration Settings", https://www.juniper.net/documentation/en_US/cso2.1/topics/reference/general/cp-apbrconfiguration-settings.html, retrieved Jul. 1, 2020, 1 pg.

Wikipedia, "Pushdown automaton", https://en.wikipedia.org/wiki/Pushdown_automaton, retrieved Jul. 1, 2020, 8 pgs.

Goessner, "JSONPath—XPath for JSON", http://goessner.net/articles/JsonPath/, retrieved Jul. 1, 2020, 6 pgs.

Wikipeda, "Lambda calculus", https://en.wikipedia.org/wiki/Lambda_calculus, retrieved Jul. 1, 2020,17 pgs.

Oracle, "Java Tutorials—Lamda Expressions", https://docs.oracle.com/javase/tutorial/java/javaOO/lambdaexpressions.html, retrieved Jul. 1, 2020, 10 pgs.

Journaldev, "Python XML to JSON, XML to Dict", https://www.joumaldev.com/19392/python-XML-to-json-dict, retrieved Jul. 1, 2020, 7 pgs.

Wikipedia, "Subnetwork", https://en.wikipedia.org/wiki/Subnetwork, retrieved Jul. 1, 2020, 8 pgs.

Vmware, "xpath-for-json", https://github.com/vmware/xpath-for-json, retrieved Jul. 1, 2020, 2 pgs.

Vmware, "Universal Network and Security Objects", https://docs.vmware.eom/en/VMware-NSX-for-vSphere/6.2/com.vmware.nsx.admin.doc/GUIDD52361ED-4814-4472-8B29-F22EBDB4A478.html, retrieved Jul. 1, 2020, 1 pg.

Soundarajan, Vijayaraghavan et al. "Simplifying Virtualization Management with Graph Databases", VMware's Technical Journal, 2013, 8 pgs.

Cisco, "Cisco ASA 5500-X with FirePOWER", https://www.cisco.com/c/en_in/products/security/asa-firepower-services/index.html. retrieved Jul. 1, 2020, 14 pgs.

VMware, "VMware Infrastructure (VI) API Reference Documentation", https://www.vmware.com/support/developer/vc-sdk/visdk25pubs/ReferenceGuide/, retrieved Jul. 1, 2020, 1 pg.

VMware, "VMware HCX", https://www.vmware.com/content/dam/digitalmarketing/vmware/en/pdf/products/nsx/vmware-nsx-hybrid-connect-faq.pdf, retrieved Jul. 1, 2020, 2 pgs.

Wikipedia, "Dependency graph", https://en.wikipedia.org/wiki/Dependency_graph#Recognizing_impossible_evaluations, retrieved Jul. 1, 2020, 3 pgs.

Wikipedia, "Directed acyclic graph", https://en.wikipedia.org/wiki/Directed_acyclic_graph, retrieved Jul. 1, 2020, 16 pgs.

Stackoverflow, Diff for Directed Acyclic Graphs:, https://stackoverflow.com/questions/16553343/diff-for-directed-acyclic-graphs, retrieved Jul. 1, 2020, 4 pgs.

\* cited by examiner

```
{
    "metadata" : {
        "edge_0" : {
            "type" : "edge",
            "oldValue" : "edge-17",
            "scope" : "self"
        },
        "interface_0" : {
            "type" : "interface",
            "oldValue" : "vNic_0",
            "ipAddresses" :
"172.23.45.5V24;10.20.13.1,10.20.13.60,10.20.13.56V24" ,
            "vnicType" : "uplink",
            "scope" : "network-27"
        },
```

FIG. 3A

```
"interface_1": {
    "type": "interface",
    "oldValue": "vNic_1",
    "ipAddresses":
"10.45.1.5,10.45.1.7,10.45.1.6\6/24;20.451.5,20.45.1.7,20.45.1.6\/24
",
    "vnictype":  "internal",
    "scope":  "virtualwire-6"
},
"firewall_0": {
    "type": "firewall",
    "oldValue": "131077",
    "scope":   "$ (edge_0)"
},
"firewall_1": {
    "type": "firewall",
    "oldValue": "131078",
    "scope":   "$ (edge_0)"
},
"ip_0": {
    "type": "ip",
    "oldValue": "20.45.1.6",
    "oldSubnet": "20.45.1.5,20.45.1.6\/24",
    "lambda": "x => { select value from x . Value}",
    "scope": "$ (interface_1)",
},
"ip_0": {
    "type": "ip",
    "oldValue": "172.34.6.32",
    "userInputNeeded": true,
    "scope": "external"
},
"ipset_0": {
    "type": "ipset",
    "oldValue": "ipset-18",
    "name": "App Server"
},
"ipset_0": {
    "type": "ipset",
    "oldValue": "ipset-17",
    "name": "Web Server"
},
"ip_2": {
    "type": "ip",
    "oldValue": "10.20.13.60",
    "oldSubnet": "10.20.13.1,10.20.13.60,10.20.13.56\/24",
    "lambda": "x => { select value from x . Value}",
    "scope": "$ (interface_0)",
},
"ip_3": {
    "type": "ip",
    "oldValue": "10.20.13.56",
    "oldSubnet": "10.20.13.1,10.20.13.60,10.20.13.56\/24",
    "lambda": "x => { select value from x . Value}",
    "scope": "$ (interface_0)",
}
},
"templates": [
    {
```

FIG. 3B

```
            "type" : "interface",
            "payload" : {
                "label" : "$ (interface_0)",
                "name" : "uplink",
                // other details specific to interface
                "portgroupId" : "network-27",
                "portgroupName" : "VM Network"
            }
        },
        {
            "type" : "interface",
            "payload" : {
                "label" : "$ (interface_1)",
                "name" : "INT VLAN 45",
                // other details specific to interface
                "portgroupId" : "virtualwire-6"
            },
            "scope" : "virtualwire-6"
        },
        {
            "type" : "ip",
            "scope" : "$ (interface_1)",
            "payload" : {
                "ip" : "$ (ip_0)",
                "scope" : "$ (interface_1)"
            }
        },
        {
            "type" : "Ip",
            "scope" : "external",
            "payload" : {
                "ip" : "$ (ip_1)",
                "scope" : "external"
            }
        },
        {
            "type" : "Ip",
            "scope" : "$ (interface_0)",
            "payload" : {
                "ip" : "$ (ip_2)",
                "scope" : "external"
            }
        },
        {
            "type" : "Ip",
            "scope" : "$ (interface_0)",
            "payload" : {
                "ip" : "$ (ip_3)",
                "scope" : "external"
            }
        },
        {
            "type" : "ipset",
            "scope" : "edge-17",
            "payload" : {
                "object Id" : "$ (ipset_0)",
                "name" : "App server",
                "value" : "$ (ip_2)"
            }
```

FIG. 3C

```
        },
        {
            "type": "ipset",
            "name": "Web Server",
            "scope": "edge-17",
            "payload": {
                "objectId": "$ (ipset_1)",
                "name": "Web Server",
                "value": "$ (ip_3)"
            }
        },
        {
            "type": "fireWall",
            "payload": {
                "ruleId": "$ (firewall_0)",
                "ruleTed": 131077,
                "name": "App and Web to DB",
                "action": "accept",
                "source": {
                    "exclude": false,
                    "ipAddress": [],
                    "groupingObjectId": [
                        "$ (ipset_1)",
                        "$ (ipset_0)"
                    ]
                },
                "defaultPilicy": {
                    "action": "deny",
                    "loggingEnablrd": false
                }
            }
        },
        {
            "type": "fireWall",
            "payload": {
                "ruleId": "$ (firewall_1",
                "ruleTed": 131078,
                "name": "Dynamic Routing",
                "source": {
                    "exclude": false,
                    "ipAddress": [,
                        "$ (ip_1)"
                    ],
                    "groupingObjectId": [
                        "$ (ipset_1)",
                    ],
                    "vnicGroupId": []
                },
                "destination": {
                    "exclude": false,
                    "ipAddress": [,
                        "$ (ip_1)"
                    ],
                    "groupingObjectId": [
                        "vnicGroupId": []
                }
            }
        }
    ]
```

FIG. 3D

SYSTEM AND METHOD FOR IDENTIFYING STALE SOFTWARE-DEFINED NETWORK COMPONENT CONFIGURATIONS

RELATED APPLICATIONS

Benefit is claimed under 35 U.S.C. 119(a)-(d) to Foreign Application Serial No. 201941029992 filed in India entitled "SYSTEM AND METHOD FOR IDENTIFYING STALE SOFTWARE-DEFINED NETWORK COMPONENT CONFIGURATIONS", on Jul. 24, 2019, by VMWARE, Inc., which is herein incorporated in its entirety by reference for all purposes.

The present application is related in subject matter to U.S. patent application Ser. No. 16/591,647, U.S. patent application Ser. No. 16/591,654, which is incorporated herein by reference.

BACKGROUND

Virtual routers and edge-gateways form an important part of software-defined networking (SDN) in a cloud computing environment, such as a private, public or hybrid (private and public) cloud computing environment. In a hybrid cloud infrastructure, these SDN components (e.g., routers and edge-gateways) carry more context than just the state of individual configured-services. The context, for instance, also includes the information of the layer at which an SDN component is working and of the peers with which the SDN component is operating. Together, the SDN components form an ecosystem in a cloud computing environment.

Similar to virtual machines, which can be spawned and removed in extremely large numbers, the SDN components can be spun-up or configured on the fly. However, unlike virtual machines, the configurations of SDN components heavily depend on their operating context (e.g., interface configurations, hierarchy, peer-networks and SDN-controller states). While backup-restore or versioning of virtual machines can be achieved in various ways (e.g., changed block tracking (CBT), snapshotting etc.), the same techniques will not work for SDN component configurations due to the nature of SDN.

In addition, due to the complexity in migrating configurations of SDN components from one computing environment to another computing environment, network administrators have difficulty in planning, evaluating and addressing various issues for such migrations, including identifying stale or otherwise invalid SDN component configurations.

SUMMARY

A computer-implemented system and method for identifying stale configurations of a software-defined network (SDN) component uses a configuration export file of the SDN component to generate configuration dependency strands for configurations of the SDN component. The configuration dependency strands can then be classified as being stale based on at least one of path length, reference count and a custom attribute to elements in a network infrastructure for the configuration dependency strands.

A computer-implemented method for identifying stale configurations of an SDN component comprises generating configuration dependency strands for configurations of the SDN component using a configuration export file of the SDN component, the configuration dependency strands including nodes for correlation keys defined in the configuration export file, the configuration export file including information to configure the SDN component in a computing environment, computing attributes of the configuration dependency strands using information of the nodes, including a path length for each of the configuration dependency strands and a reference count of links from any node of each of the configuration dependency strands to elements in a network infrastructure, and classifying a particular configuration dependency strand from the configuration dependency strands for the configurations of the SDN component as being stale based on at least one of the path length and reference count for the particular configuration dependency strand. In some embodiments, the steps of this method are performed when program instructions contained in a non-transitory computer-readable storage medium are executed by one or more processors.

A system in accordance with an embodiment of the invention comprises memory and at least one processor configured to generate configuration dependency strands for configurations of the SDN component using a configuration export file of the SDN component, the configuration dependency strands including nodes for correlation keys defined in the configuration export file, the configuration export file including information to configure the SDN component in a computing environment, compute attributes of the configuration dependency strands using information of the nodes, including a path length for each of the configuration dependency strands and a reference count of links from any node of each of the configuration dependency strands to elements in a network infrastructure, and classify a particular configuration dependency strand from the configuration dependency strands for the configurations of the SDN component as being stale based on at least one of the path length and reference count for the particular configuration dependency strand.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which:

FIGS. 3A-3D shows a practical configuration export JSON file in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
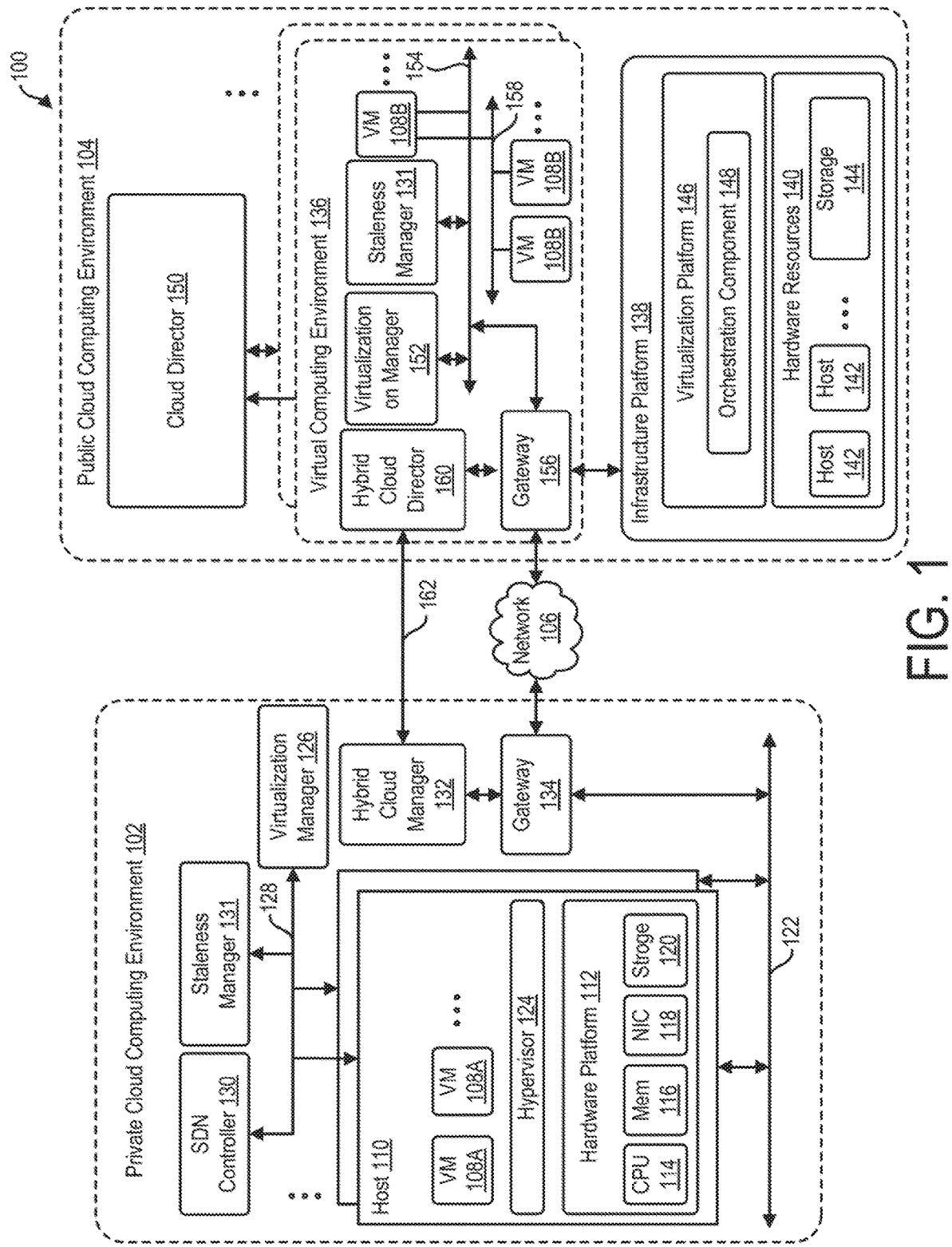
FIG. 1 is a block diagram of a computing system with a staleness manager in accordance with an embodiment of the invention.

Turning now to FIG. 1, a block diagram of a computing system 100 in accordance with an embodiment of the invention is shown. The computing system may be a hybrid cloud computing system, which includes at least one private cloud computing environment 102 and at least one public cloud computing environment 104 that are connected to each other via a network 106. The computing system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders, such as the particular enterprise in addition to other enterprises. In some embodiments, the private cloud computing environment may be a private or on-premise data center. The network 106 can be any type of computer network or a combination of networks that allows communications between devices connected to the network. The network may include the Internet, a wide area network (WAN), a local area network (LAN), a storage area network (SAN), a fibre channel network and/or other networks. The network may be configured to support protocols suited for communications with storage arrays, such as Fibre Channel, Internet Small Computer System Interface (iSCSI), Fibre Channel over Ethernet (FCoE) and HyperSCSI. The license server may be located within the private cloud computing environment or the public cloud computing environment.

The private and public cloud computing environments 102 and 104 of the computing system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

In some embodiments, the computing system 100 supports migration of the virtual machines 108 between the private and public cloud computing environments 102 and 104. The computing system may also support migration of the virtual machines between different sites situated at different physical locations, which may be computing environments in the private and/or public cloud computing environments.

As shown in FIG. 1, the private cloud computing environment 102 of the computing system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other input/output devices such as, for example, a mouse and a keyboard (not shown). The processor is configured to execute instructions, for example, executable instructions that perform one or more operations described herein and may be stored in the system memory and/or the storage system. In some embodiments, the system memory is volatile memory used for retrieving programs and processing data. The system memory may include, for example, one or more random access memory (RAM) modules. The network interface enables the host to communicate with another device via a communication medium, such as a network 122 within the private cloud computing environment. The network interface may be one or more network adapters, also referred to as a Network Interface Card (NIC). The storage system 20 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In an embodiment, the virtualization manager is a computer program that resides and executes in a computer system, such as one of the hosts, or in a virtual computing instance, such as one of the virtual machines 108A running on the hosts. One example of the virtualization manager is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In the illustrated embodiment, the private cloud computing environment 102 also includes an SDN controller 130 and a staleness manager 131 connected to the management network 128. The SDN controller operates to control SDN networks, e.g., software-defined data centers (SDDCs), in the private cloud computing environment. Thus, the SDN controller manages SDN components, such as virtual routers and edge gateways, in private cloud computing environment to support the SDN networks in the private cloud computing environment. In some embodiments, there may be more than one SDN controller in the private cloud computing environment, which form a SDN controller plane.

The staleness manager 131 operates identify stale configurations of SDN components, such as virtual routers and edge gateways, which may be migrated from one computing environment to another, e.g., from one SDDC in a computing environment to another SDDC in the same or different computing environment. As used herein, configurations of SDN components may include rules and network policies that are followed or executed by the SDN components, as well as settings and parameters for the SDN component. As also used herein, a stale configuration of an SDN component includes dud, outdated or otherwise invalid configuration. Migration of SDN component configurations allows corresponding SDN components to be readily spawned or deployed in different computing environments, which can properly perform the same tasks as the original SDN components in the new computing environments. The identification of stale configurations of SDN components allows migration of SDN component configurations in a more efficient manner. In an embodiment, the staleness manager may be implemented as software running on one or more computer systems, which may be physical computers, such as the host computer 110, or virtual computers, such as the virtual machines 108. As illustrated in FIG. 1, there may be other staleness managers 131 in the public cloud computing environment 104 for multi-cloud application. The staleness manager 131 is described in more detail below.

In one embodiment, the private cloud computing environment 102 includes a hybrid cloud manager 132 configured to manage and integrate computing resources provided by the private cloud computing environment with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In some embodiments, the hybrid cloud manager is a virtual appliance, which may include a collection of applications or services. In one implementation, the hybrid cloud manager is a module or plug-in to the virtualization manager 126, although other implementations may be used, such as a separate computer program executing in any computer system or running in a virtual machine in one of the hosts. One example of the hybrid cloud manager is the VMware® Hybrid Cloud Extension (HCX) HCX™ product made available from VMware, Inc.

In one embodiment, the hybrid cloud manager 132 is configured to control network traffic into the network 106 via a gateway device 134, which may include a virtual appliance. The gateway device 134 is configured to provide the virtual machines 108A and other devices in the private cloud computing environment 102 with connectivity to external devices via the network 106. The gateway device 134 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the computing system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage systems 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment may be VMware cloud (VMC) on Amazon Web Services (AWS).

In one embodiment, at least some of the virtual computing environments 136 may be configured as SDDCs. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one gateway device 156, as well as one or more isolated internal networks 158 not connected to the gateway device 156. The gateway device 156, which may include a virtual appliance, is configured to provide the virtual machines 108B and other components in the virtual computing environment with connectivity to external devices, such as components in the private cloud computing environment via the network 106. The gateway device 156 operates in a similar manner as the gateway device 134 in the private cloud computing environment.

In one embodiment, each of the virtual computing environments 136 in the public cloud computing environment 104 includes a hybrid cloud director 160 configured to communicate with the corresponding hybrid cloud manager 132 in the private cloud computing environment 102 to enable a common virtualized computing platform between the private and public cloud computing environments. In some embodiments, the hybrid cloud manager is a virtual appliance, which includes a collection of applications or services. The hybrid cloud director may communicate with the hybrid cloud manager 132 using Internet-based traffic via a VPN tunnel established between the gateways 134 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director may be a component of the HCX-Cloud product and the hybrid cloud manager may be a component of the HCX-Enterprise product, which is provided by VMware, Inc.

The process of migrating configurations of SDN components, such as virtual routers and edge gateways, in the computing system 100 is very complex due to the dependencies of the SDN component being migrated to other components in the surrounding computing environment. In addition to this complexity, stale or invalid configurations of SDN components not only create noise during migration, but also consume space, memory and computation in their processing. Thus, stale configurations of SDN components create significant overhead to the migration process.

There are various reasons why configurations of SDN components become stale. Typically, over time, administrators leave and new ones join and the history and/or context about why some rules and policies were created in the past is gradually lost. In addition, as newer constructs are introduced, the older constructs never get cleaned up, causing more aversion to changes and/or optimization in the configurations of SDN components. This goes into a vicious cycle, which results in stale configurations of SDN components.

The staleness manager 131 operates to identify potential invalid configurations of SDN components so that users or network administrators can take one or more actions in response to the identified SDN component configurations, including ignoring the potential stale configurations of SDN components or removing the potential stale configurations from the respective SDN components. The staleness manager uses a configuration export file to identify any potential invalid configuration of a SDN component. A configuration export file of an SDN component includes all the information needed to configure the SDN component in a new destination computing environment to function in the same manner as in the source computing environment.

Figure 2:
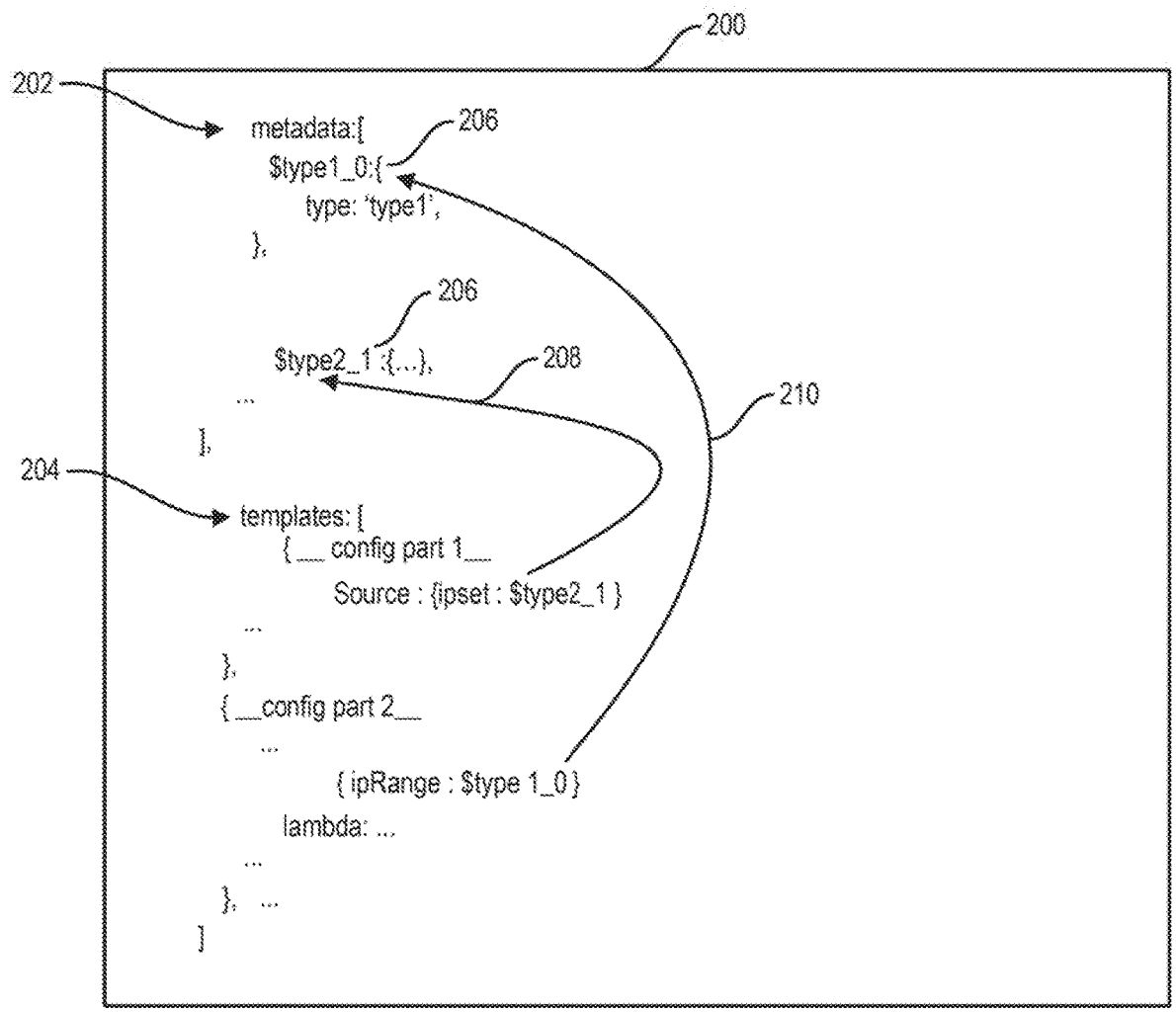
FIG. 2 shows a generic configuration export JSON file for an SDN component in accordance with an embodiment of the invention.

A generic configuration export JSON file 200 for an SDN component in accordance with an embodiment of the invention is illustrated in FIG. 2. As shown in FIG. 2, the configuration export JSON file 200 in accordance with an embodiment of the invention includes a metadata section 202 and a templates section 204. The metadata section includes a list of correlation keys 206, which represent dependencies of the SDN component. The templates section includes reframed configurations or parts of configurations ("templates") with references to the correlation keys in the metadata section, as illustrated by arrows 208 and 210 in FIG. 2. Original values in these templates are replaced by references to the corresponding correlation keys. The contents in these sections of the configuration export JSON file will be further described below.

In an embodiment, the configuration export JSON file may be automatically generated using techniques described in a simultaneously filed patent application, titled "System and Method for Migrating Configurations of Software-Defined Network Components," which is assigned to the same applicant as this patent application and incorporated herein by reference. However, the configuration export JSON file may be generated using other techniques, and even by a manual process.

A practical example of a configuration export JSON file in accordance with an embodiment of the invention is illustrated in FIGS. 3A-3D. As shown in FIGS. 3A-3D, the configuration export JSON file includes a metadata section with a number of correlation keys and a templates section with a number of template entries. Each of the correlation keys includes contents associated with the correlation key. The contents of each correlation key include at least "type" and "oldvalue" of the correlation key. The "type" is a description of the type of dependency represented by the correlation key. The "oldvalue" is the original or initial value of the correlation key at the source computing environment. Each of the template entries includes an identifier of the template entry and a reference to at least one correlation key. The identifier of a template entry is found as the first element in the payload, which can be "label", "ip", "objected" or "ruleId" in this correlation export JSON file. Each reference to a correlation value is marked by the symbol "$" followed by the correlation key in parentheses. It is noted here that a reference is made to the identifier of each template entry.

The configuration export file of an SDN component is based on a model of configurations for an SDN component in a computing environment. This model is a tree structure, which shows all the dependencies of an SDN component. An example of such tree structure for an SDN component, e.g., a virtual router, is shown in FIG. 4.

Figure 4:
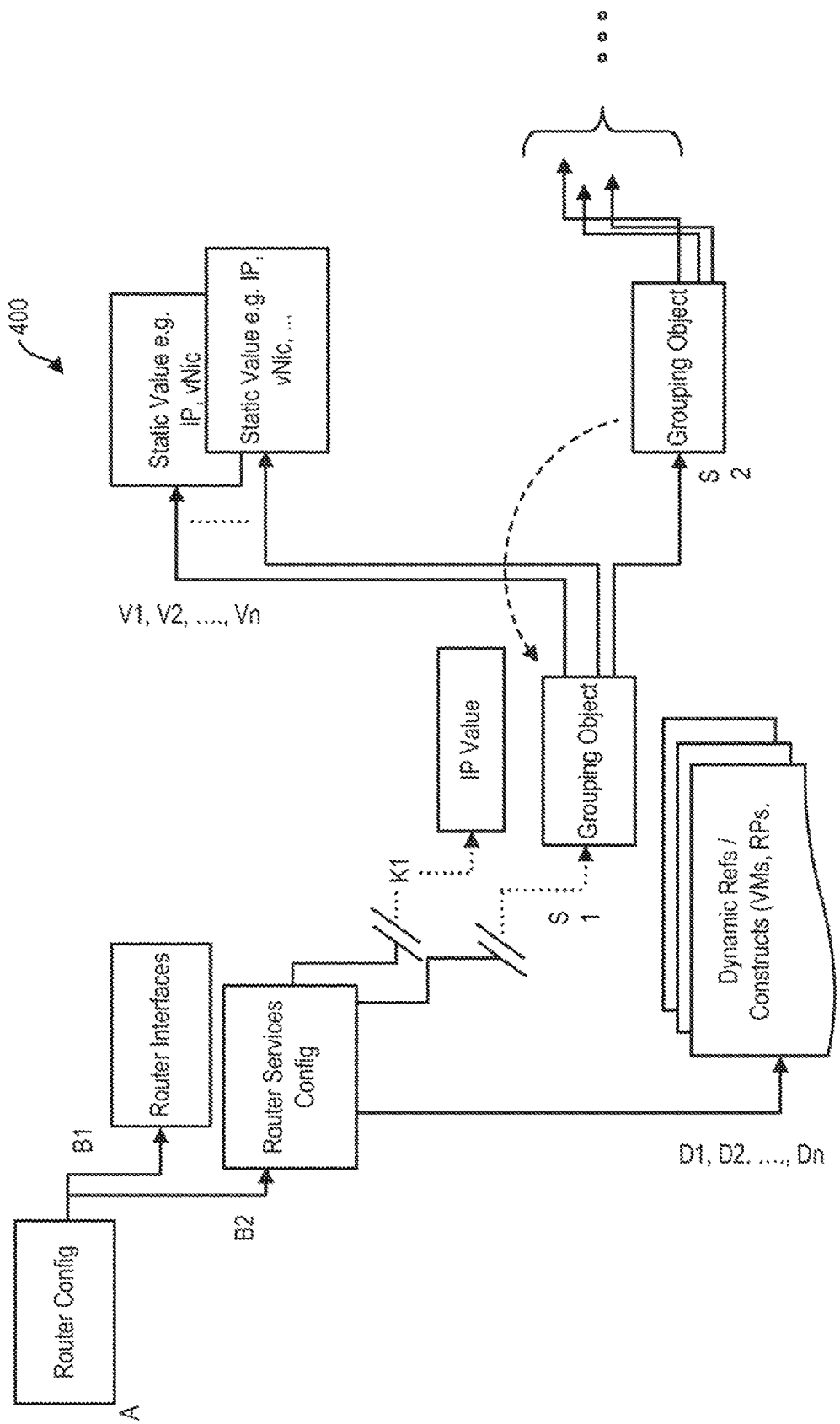
FIG. 4 is a diagram of a tree of constructs that can be used to visualize a router configuration in accordance with an embodiment of the invention.

As illustrated in FIG. 4, a virtual router configuration can be visualized as a tree 400 of constructs, each representing a dependency of the virtual router, in accordance with an embodiment of the invention. The root of the tree 400 is a router configuration A. The other constructs of the tree 400 include router interfaces B1, a router services configuration B2, dynamic references/constructs D1, . . . , Dn (e.g., virtual machines and resource pools), an IP value K1, grouping objects S1, . . . , Sn, and static values V1, . . . , Vn (e.g., IP values and vNic values). Note that grouping objects can refer to other grouping object, e.g., the grouping object S2 referring to the grouping object S1. Thus, FIG. 4 illustrates the potential complexity of router configurations with hierarchy of grouping objects nested within each other.

Using a configuration export file of an SDN component, such as the configuration export JSON file shown in FIGS. 3A-3D, the staleness manager 131 processes the configuration export file into linear configuration dependency chains or strands, which are referred to herein as "configuration DNA strands." The staleness manager then examines these configuration DNA strands to identify those that may be invalid. In some embodiments, the staleness manager may determine that a configuration DNA strand is invalid based on reference-count determination and/or a path-length classification. In other embodiments, custom attributes can also be included, in addition to reference-count and/or path-length, for better precision in determination of the classification of the stale configuration DNA strands. Examples of these custom attributes are described below with reference to FIG. 7.

The reference-count determination uses dependency correlations along a configuration DNA strand path for an SDN component configuration to determine whether that SDN component configuration is invalid. When a configuration DNA strand path for an SDN component configuration does not have any reference (reference count=0) to anything in the infrastructure, that SDN component is determined to be a possible invalid SDN component configuration.

Figure 5:
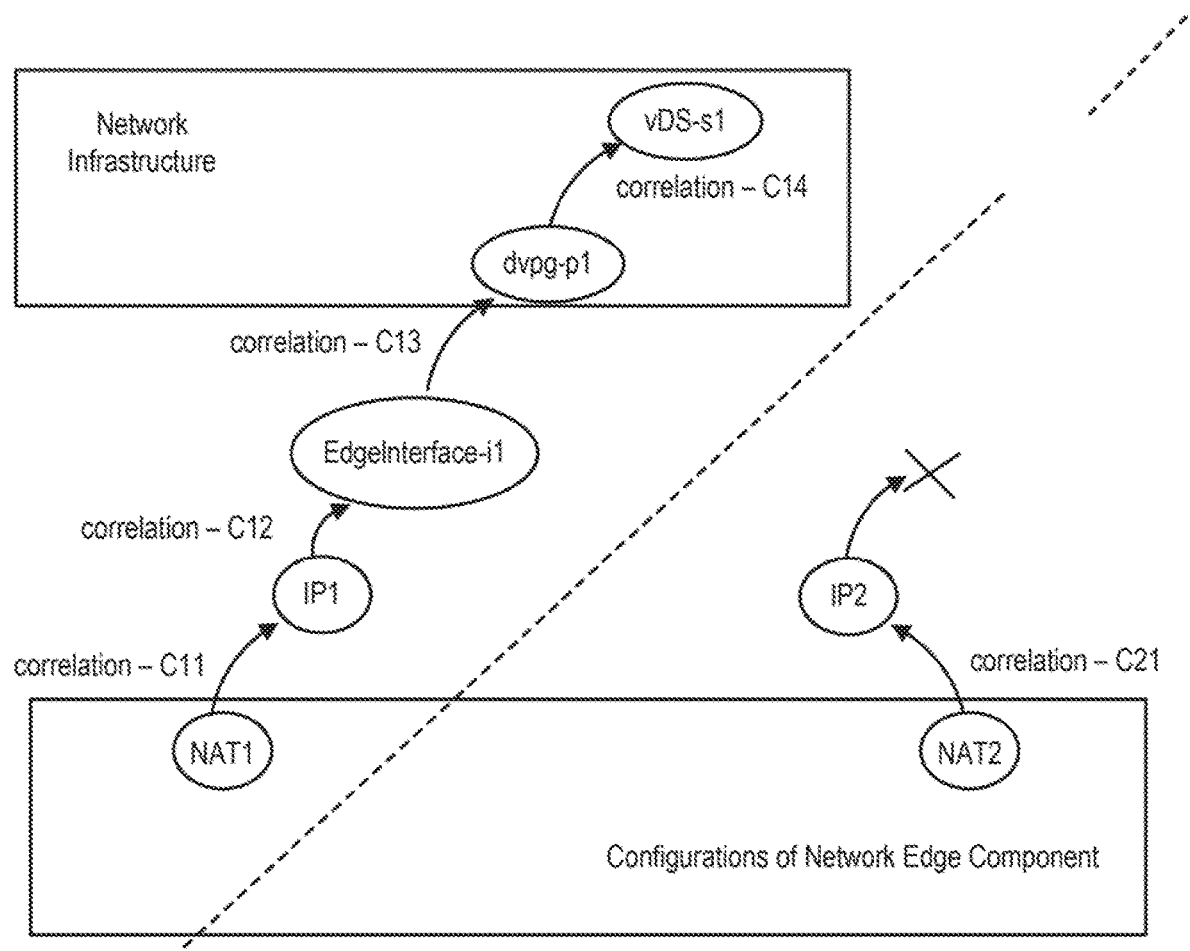
FIG. 5 illustrates a reference-counting determination for identifying stale SDN component configurations in accordance with an embodiment of the invention.

The reference-count determination is illustrated in FIG. 5, which is an example of two SDN component configurations in the form of network address translation (NAT) rules, which are illustrated as "NAT1" and "NAT2" rules for a network edge component. The NAT1 rule is a starting node of a configuration DNA strand. Similarly, the NAT2 rule is a starting node of another configuration DNA strand. As shown in FIG. 5, the NAT1 rule has a first correlation C11 to an IP address "IP1", which has a second correlation C12 to an edge interface "Edgeinterface-i1". The Edgeinterface-i1 has a third correlation C13 to a distributed virtual port group "dvpg-p1", which has a fourth correlation C14 to a virtual distributed switch "vDS-s1". The dvpg-p1 and vDS-s1 are elements of a network infrastructure that includes the network edge component. Thus, the path of the configuration DNA strand for the NAT1 rule has two references (reference count=2) to elements in the infrastructure. Therefore, the NAT1 rule cannot be identified as a possible stale rule.

In contrast, as shown in FIG. 5, the NAT2 rule has a first correlation C21 to an IP address "IP2". However, the IP2 has no correlation to anything else. Thus, the path of the configuration DNA strand for the NAT2 path does not have any reference to anything in the network infrastructure. Thus, the path of the configuration DNA strand for the NAT2 rule has no references (reference count=0) to elements in the infrastructure. Therefore, the NAT2 rule can be identified as a possible stale rule.

The path-length classification uses lengths of configuration DNA strand paths for SDN component configurations to determine whether the SDN component configurations are invalid. A path length may be defined by the number of nodes along a particular configuration DNA strand path for an SDN component configuration. In general, there could be more than one path emerging from any SDN component configuration. When an SDN component configuration have shorter path lengths than other the longest path lengths of its counterparts, then that SDN component configuration may be considered to be stale.

Figure 6:
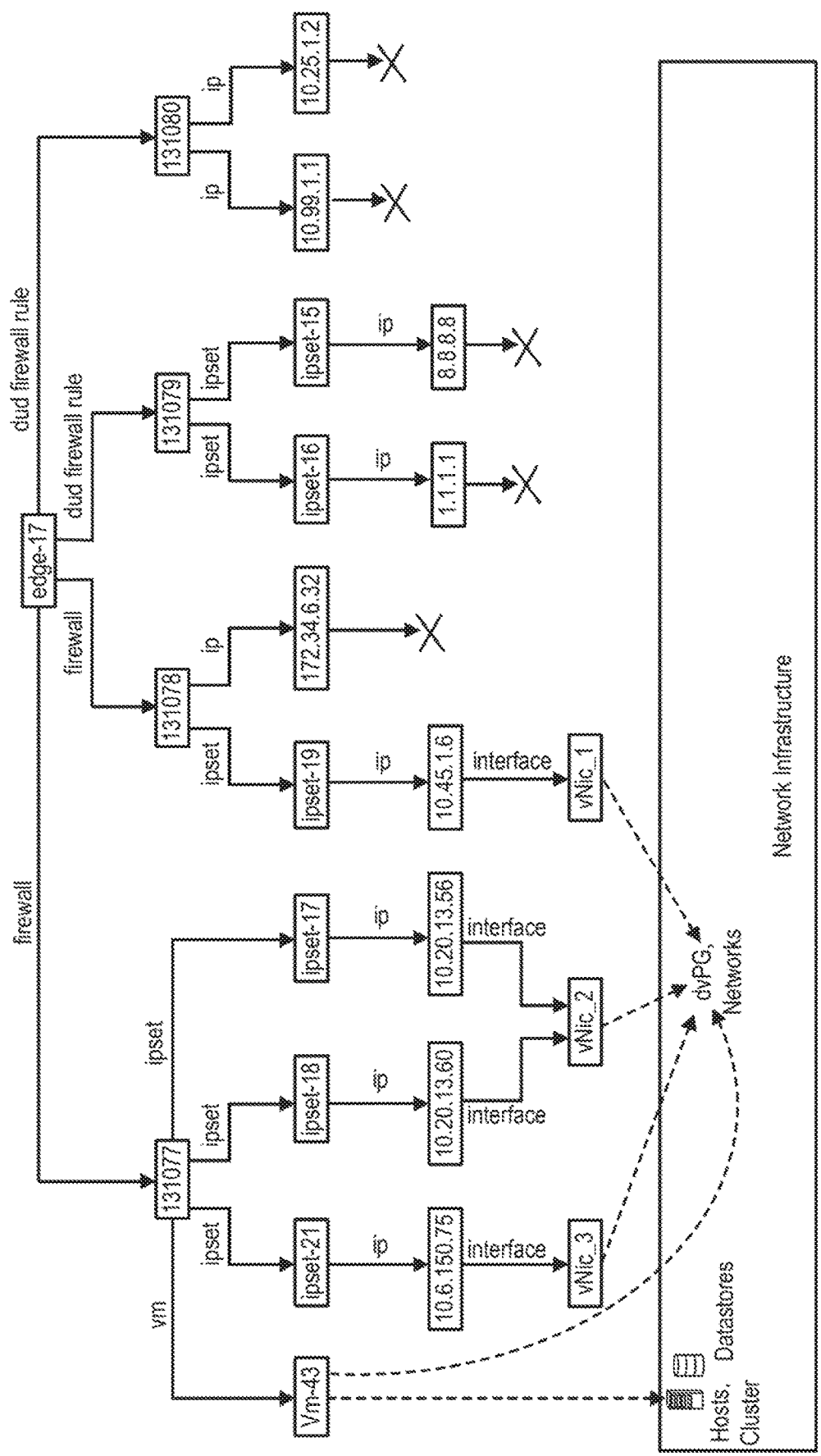
FIG. 6 illustrates a path-length classification for identifying stale SDN component configurations in accordance with an embodiment of the invention.

The path-length classification is illustrated in FIG. 6, which is an example of four firewall rules 131077, 131078, 131079 and 131080 for a network edge component "edge-17". As shown in FIG. 6, the firewall rules 131079 and 131080 have shorter path lengths starting from the network edge element to the end nodes than their counter parts, the firewall rules 131077 and 131078, which have at least one path or branch with longer lengths down to elements in a network infrastructure, which may include, but not limited to, host computers "hosts", clusters of hosts "clusters", datastores, distributed virtual port group "dvPGs" and networks. Thus, the firewall rules 131079 and 131080 may be determined to be invalid.

In an embodiment, both the reference-counting determination and the path-length classification are applied to ensure the correctness of the determination whether an SDN component configuration is stale. For instance, in FIG. 6, the firewall rule 131078 has a branch with reference count zero (indicated by a cross) but also has a path that is longer (i.e., leading to an element in the network infrastructure). Thus, the firewall rule 131078 should not be classified as a stale rule. In such a situation, the staleness manager 131 may flag the user that there exists a part of the rule that is not stale, i.e., valid, while another part of the rule being possibly stale. Thus, when there is an additional configuration DNA strand path for an SDN component configuration with one or more references to elements in a network infrastructure that is longer than the original configuration DNA strand path, that SDN component configuration may not be stale, i.e., valid.

In an embodiment, some of the components along the configuration DNA strand paths, which have been classified as possibly stale using the reference-count determination and/or path-length classification, can also be flagged as possibly stale. For instance, in FIG. 6, two IP Sets "IPSet-15" and "IPSet-16" along the configuration DNA strand paths for the firewall rule 131079 may be flagged as possibly stale.

Figure 7A:
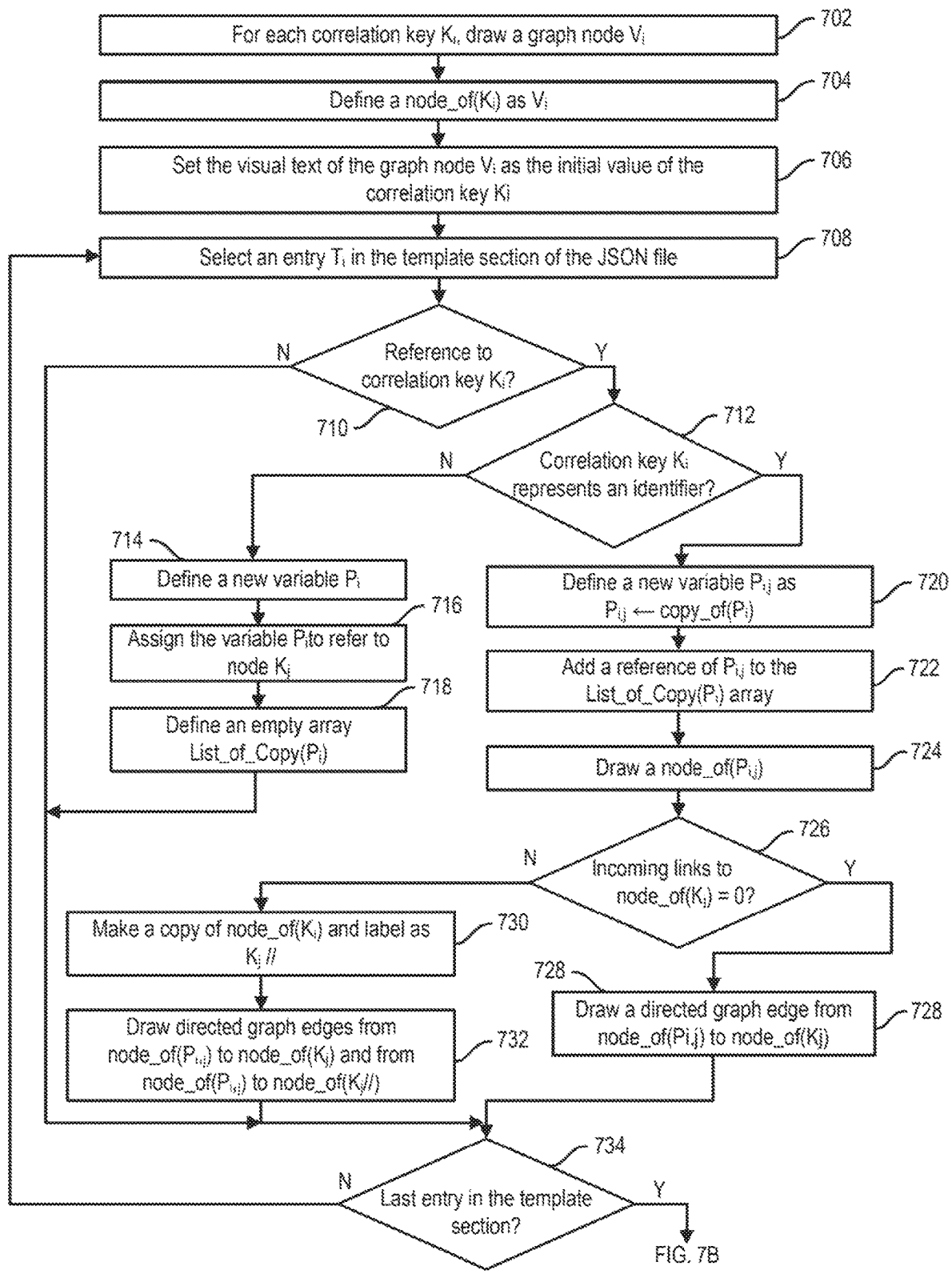
FIGS. 7A and 7B show a process flow diagram of an operation performed by the staleness manager to build configuration DNA strands for configurations of an SDN component in a computing environment in accordance with an embodiment of the invention.
Figure 7B:
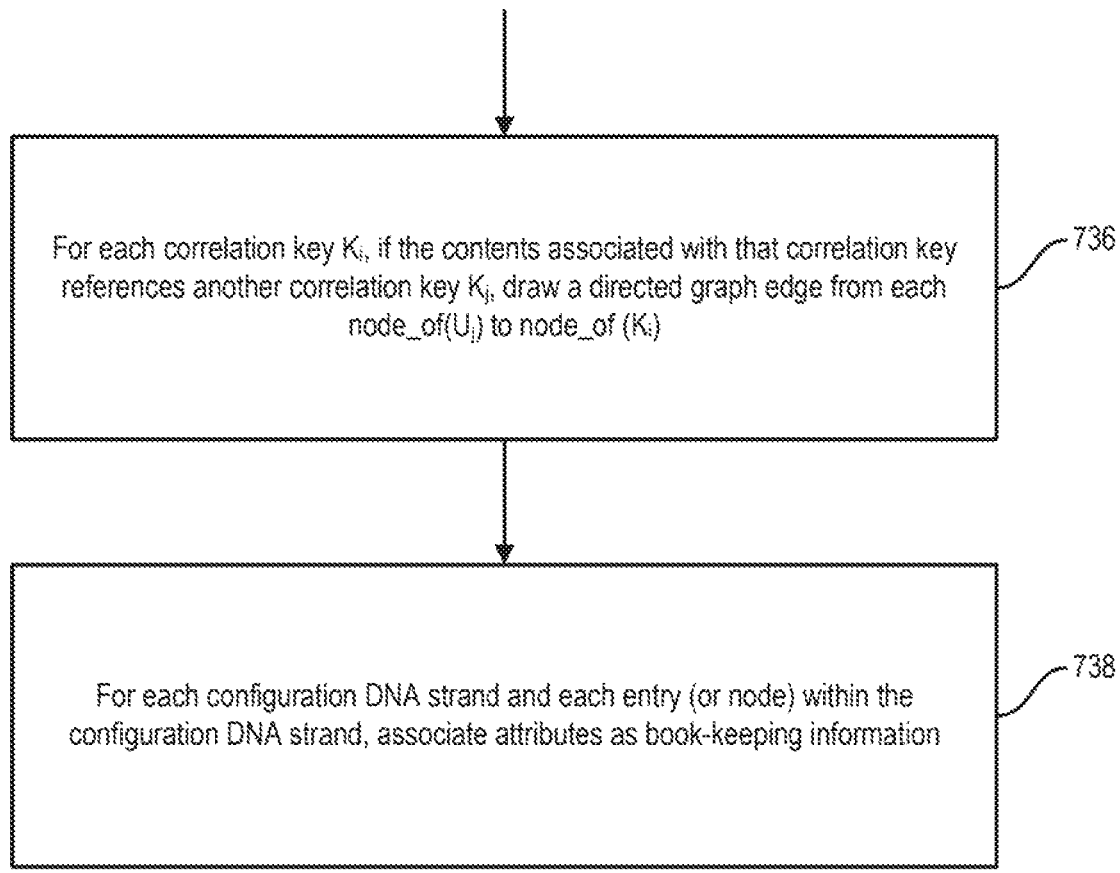

An operation performed by the staleness manager 131 to build configuration DNA strands for configurations of an SDN component in a computing environment using a configuration export file in accordance with an embodiment of the invention is described with reference to a process flow diagram of FIGS. 7A and 7B. The operation is executed in four passes on the configuration export file, which is described as being a configuration export JSON file. However, in other embodiments, the operation may be executed in different number of passes, with or without the inclusion of (and/or exclusion of) at least one custom or dynamically designated attribute, e.g., contains_vm_ref. Examples of some of these attributes are described below.

The first pass on the configuration export JSON file involves blocks 702-706. At block 702, for each correlation key $K_i$ defined in the metadata section of the configuration export JSON file, a graph node $V_i$ is drawn or electronically created. As an example, each graph node is drawn on a white board or a user interface canvas as a predefined shape, such as an ellipse or a circle. Next, at block 704, a node_of($K_i$) is defined as $V_i$. The node of ($K_i$) is a function that takes the correlation key $K_i$ and outputs a graph node corresponding to the correlation key $K_i$. Next, at block 706, the visual text of the graph node $V_i$ is set as the initial value (or source-side value) of the correlation key $K_i$ so that a user can easily identify the nodes based on their initial values. In an embodiment, the implementation would capture all the details within the program memory corresponding to each node, which include, but not limited to, initial value, scope, node name, number of incoming links, number of outgoing links, visual attributes such as color, size, shape, fill style etc.

Figure 8:
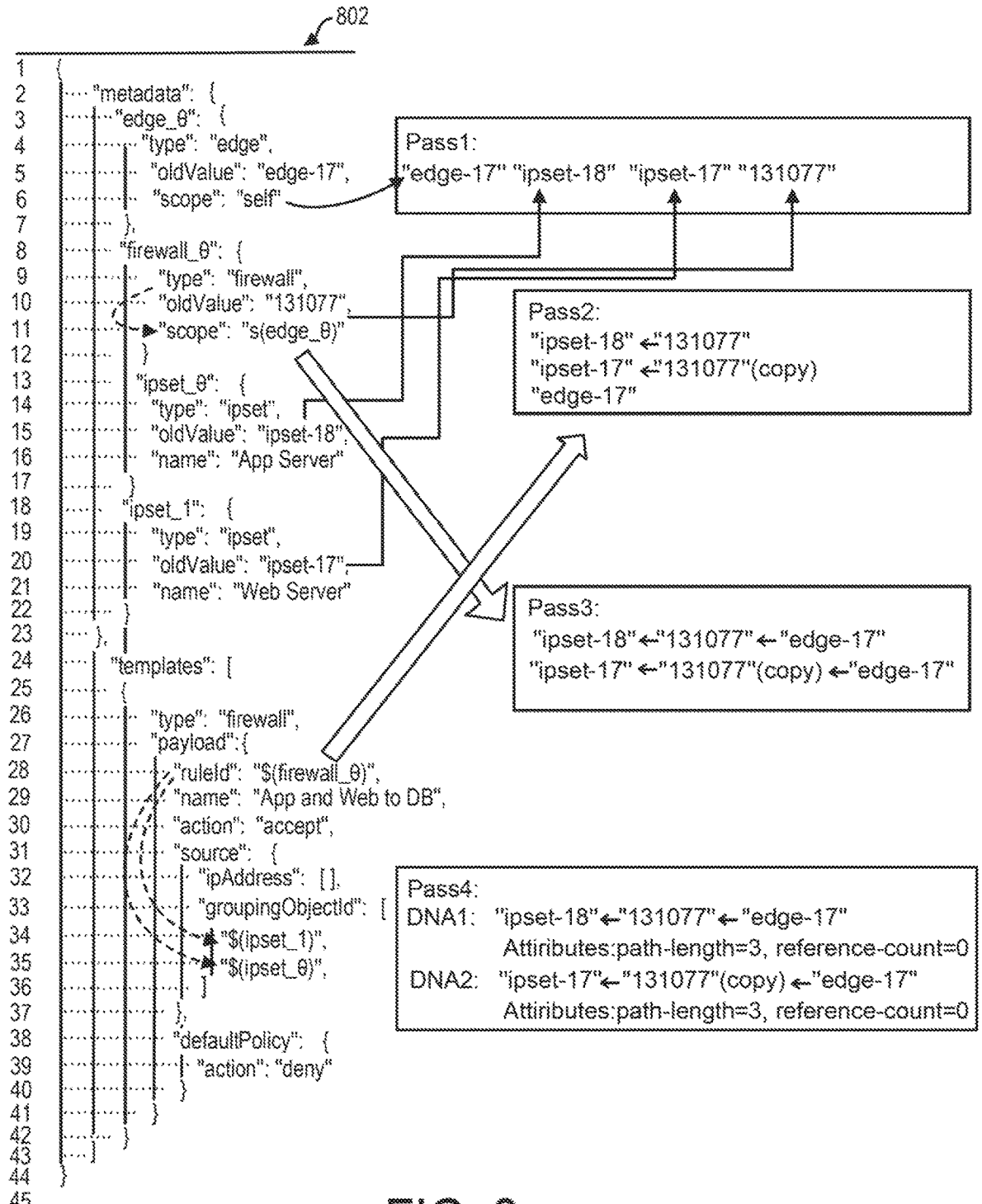
FIG. 8 illustrates results of the operation to build configuration DNA strands after different passes of the operation in accordance with an embodiment of the invention.

FIG. 8 illustrates the results of the first pass on a partial correlation export JSON file 802 in an accordance with an embodiment of the invention. In this example, there are four correlation keys $K_1$-$K_4$ in the metadata section of the correlation export JSON file. The four correlation keys $K_1$-$K_4$ are edge_0, firewall_0, ipset_0 and ipset_1, respectively. Thus, four graph nodes $V_1$-$V_4$ are created. As illustrated, each graph node is indicated by a corresponding node_of ($K_i$). Thus, the graph nodes $V_1$-$V_4$ are indicated by the node_of("edge_0"), the node_of("firewall_0"), the node_of ("ipset_0") and the node_of("ipset_1"), respectively. In addition, the visual text of the graph nodes $V_1$-$V_4$ are set to their initial value (shown as "oldValue" in the confirmation export JSON file). Thus, the visual text of the graph nodes $V_1$-$V_4$ are set to "edge-17", "131077", "Ipset-18" and "Ipset-17", respectively, which are the results of the first pass.

The second pass on the configuration export JSON file involves blocks 708-734. At block 708, an entry $T_i$ in the template section of the configuration export JSON file is selected to be processed. Next, at block 710, a determination is made whether there exists a reference (i.e., "$$K_j$") in the body of entry $T_i$ to a correlation key $K_j$. If no, then the operation proceeds to block 734. If yes, the operation proceeds to block 712.

Figure 9:
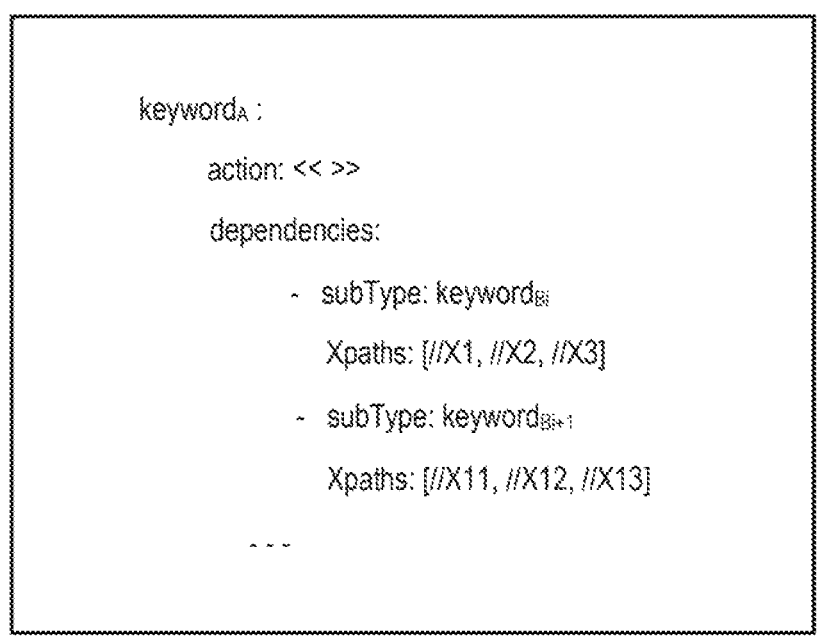
FIG. 9 shows a generic configurable dictionary in accordance with one embodiment of the invention.

At block 712, a determination is made whether the correlation key $K_j$ represents an identifier as per a configurable dictionary (e.g., ID or objectID or ruleID, etc.) for the SDN component. A configurable dictionary is like a rule book, which tells a processor what to look for and what to do when it is found. An example of a generic configurable dictionary is illustrated in FIG. 9. In the example shown in FIG. 9, a generic configurable dictionary 900 includes a keyword$_A$, action and dependencies. The keyword$_A$ represents vendor-specific construct (e.g., dfw, ipset, ip, securitygroup, vm, . . . ) and action, if unspecified, defaults to fetching the definition of keyword$_A$, for example, using REST API, using the identification (ID) in case of object, or finding the correlation function, e.g., the lambda, if the keyword$_A$ is a primitive/atomic value (e.g., an IP address). The action also encapsulates API endpoint details. Each dependency is a list of structs {subType, xpaths}, where each struct specifies the sub-component that should be searched for, within the definition of keyword$_A$. For instance, within the keyword "ipset", there would be dependency struct with subType "ip". The XPaths specify the potential locations a keywords, could exist within the definition of keyword$_A$. The configurable dictionary contains entries for each of the keyword$_{Bi}$.

If yes (at block 712), then the operation proceeds to block 714, where a new variable $P_i$ is defined. Next, at block 716, the new variable $P_i$ is assigned to refer to a node $K_j$. Thus, node_of($P_i$) will be a reference to (or an "alias of") node_of ($K_j$) for this particular subscript j at this point of time. Next, at block 718, an empty array List_of_Copy($P_i$) is defined. The operation then proceeds to block 734.

However, if no (at block 712), then the process proceeds to block 720, where a new variable $P_{i,j}$ is defined as $P_{i,j}$←copy_of($P_i$), where the "copy_of" function makes a deep memory copy of the function parameter, including outgoing links. The "copy_of" function in accordance with an embodiment of the invention is illustrated in FIG. 10.

Figure 10:
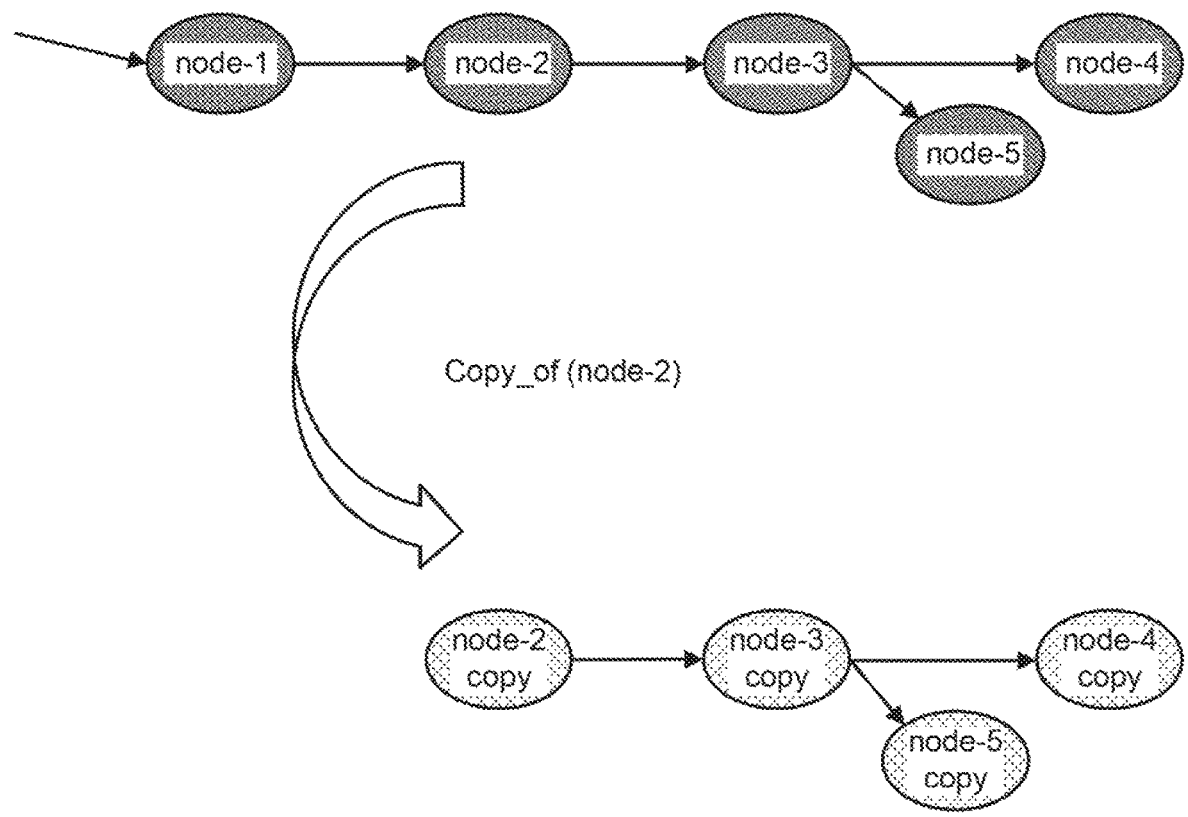
FIG. 10 illustrates a "copy_of" function in accordance with one embodiment of the invention.

As shown in FIG. 10, there are five nodes, node-1, node-2, node-3, node-4 and node-5, that are connected to each other in a linear fashion starting from the node-1 and ending at the node-4 or the node-5. In particular, there are three nodes that follow the node-2. If the "copy_of" function is applied to the node-2, then the node-2 will be copied along with the three nodes that follow the node-2, including the connections between to the node-2 and to each other. Thus, the "copy_of" function deep copies the entire chain from the egress links of the argument node (node-2 in the illustrated example) until the end, which may include multiple nodes (node-4 and node-5 in this example). However, the links ingress to the argument node are not copied.

Next, at block 722, a reference of $P_{i,j}$ is added to the already created List_of_Copy($P_i$) array. Next, at block 724, a node_of($P_{i,j}$) is drawn or electronically created. The node_of($P_{i,j}$) is referred to as the head of the current chain (or partially formed configuration DNA strand) in the making.

Next, at block 726, a determination is made whether the number of incoming links to node_of($K_j$) equals to zero, which can be expressed number_of_incoming_links(node_of($K_j$))=0. If yes, at block 728, a directed graph edge is drawn from the node_of($P_{i,j}$) to the node_of($K_j$), where $P_{i,j}$ would have been assigned earlier at block 718 for some other j at that earlier point in time. If no, then the process proceeds to block 730, where a copy of the node_of($K_j$) is made and it is labeled as $K_j''$. Next, at block 732, a directed edge is drawn from the node_of($P_{i,j}$) to the node_of($K_j$) and another directed edge is drawn from the node_of($P_{i,j}$) to the node_of($K_j''$). The operation then proceeds to block 734.

At block 734, a determination is made whether the current entry $T_i$ is the last entry in the template section of the configuration export JSON file. If no, then the operation proceeds back to block 708, where another entry in the template section of the configuration export JSON file is selected to be processed. If yes, then the operation proceeds to block 736 (the third pass).

FIG. 8 illustrates the results of the second pass on the partial correlation export JSON file 802. In this example, a directed edge is drawn from "131077" to "ipset-18". In addition, a directed edge is drawn from a copy of "1310477" to "ipset-17". Lastly, there is no directed edges from or to "edge-17".

The third pass on the configuration export JSON file involves block 736. At block 736, for each correlation key K if the contents (e.g., lambda, type, scope etc.) associated with that correlation key references another correlation key then for each pair ($K_i$, $U_j$), where $U_j$ represents a copy of $K_j$ (or is present in the List_of_Copy ($P_i$), a directed graph edge is drawn from each node_of($U_j$) to node_of ($K_i$). Thus, multiple chains are linked lists with a starting node (called "head") and an ending node (called "tail" are obtained. Each linked list obtained is referred to herein as a "configuration DNA strand."

FIG. 8 illustrates the results of the third pass on the partial correlation export JSON file 802. In this example, a directed edge is drawn from "edge-17" to "131077". In addition, a directed edge is drawn from a copy of "edge-17" to the copy of "131077". Thus, a first configuration DNA strand with the head being "edge-17" and the tail being "ipset-18" is obtained. In addition, a second configuration DNA strand with the head being copy of "edge-17" and the tail being "ipset-17" is obtained.

The fourth pass on the configuration export JSON file involves block 738. At block 738, for each configuration DNA strand and each entry (or node) within the configuration DNA strand, attributes are associated as book-keeping information. These attributes include, but not limited to:

1. path length: an integer (≥0) that indicates the number of nodes in a linked list representing a configuration DNA strand.
2. reference count: an integer (≥0) that represents the number of links leading to dependency amongst infrastructure components (e.g., SDDC components), such as compute, storage, etc.). The reference count of a given parent node is the sum of the reference counts of the children or leaf nodes in the egress chains emerging from the parent node.
3. ingress count (or incoming edges): an integer (≥0) represents the number of incoming edges to a particular node.
4. egress count (or outgoing edges): an integer (≥0) represents the number of outgoing edges from a particular node.
5. Stale strand: used to signify whether an entire configuration DNA strand is invalid. This attribute is populated while executing a staleness identification operation, which is described below.
6. Set of flags:
   a. contains virtual machine reference
   b. contains Virtual Extensible LAN (VXLAN) reference
   c. contains grouping object reference
   d. other custom flags
7. type: type of the object/entry (e.g., ipSet, ip, firewall, nat, dhcp, interface)
8. stale entry: used later to signify that this object/entry is invalid.

FIG. 8 illustrates the results of the fourth pass on the partial correlation export JSON file 802. In this example, the first configuration DNA strand DNA1 includes path length and reference count attributes. The second configuration DNA strand DNA1 also includes path length and reference count attributes.

In an alternative embodiment, a directed acyclic graph (DAG) of configurations of an SDN component, which includes all the dependencies of the SDN component configuration, is obtained using techniques described in the simultaneously filed patent application, titled "System and Method for Generating Correlation Directed Acyclic Graphs for Software-Defined Network Components." Using the DAG, all paths are found starting from the root of the DAG and ending in each of the leaf nodes as a destination. These paths may be found by applying a standard DAG traversal algorithm, which can be easily found in the Internet. Once all the paths are obtained, the fourth pass described above can be applied to assign the attributes to each configuration DNA strand and nodes in that configuration DNA strand.

Figure 11:
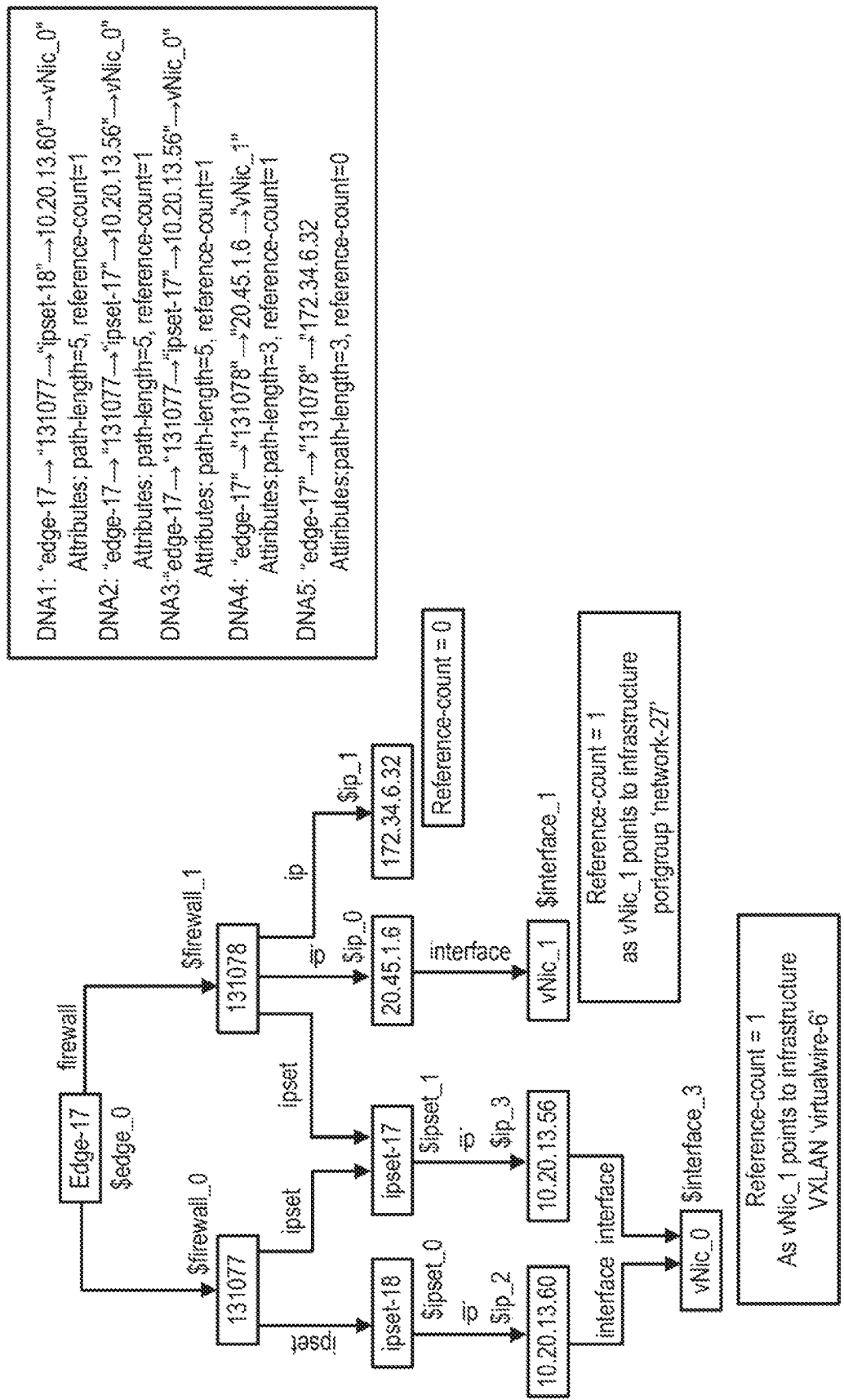
FIG. 11 illustrates the user of a directed acyclic graph (DAG) of configurations of an SDN component to build configuration DNA strands in accordance with an alternative embodiment of the invention.

This alternative embodiment is illustrated in FIG. 11, which shows a DAG generated using a technique described in the simultaneously filed patent application, titled "System and Method for Generating Correlation Directed Acyclic Graphs for Software-Defined Network Components." As shown in FIG. 11, five paths for the DAG are obtained. These five paths include configuration DNA strands DNA1, DNA2, DNA3, DNA4 and DNA5. As illustrated, attributes are assigned to the configuration DNA strands, as well as some of the nodes on the configuration DNA strands, such as nodes "vNic_0", "vNic_1" and "172.34.6.32" (IP address).

Once the configuration DNA strands and attributes are obtained, the staleness manager 131 stores the configuration DNA strands and attributes. The configuration DNA strands may be stored in a list, which may be called a "DNA" list. In an embodiment, the configuration DNA strands and attributes may be stored within the corresponding correlation export JSON file itself or as a copy of the JSON file.

The staleness manager 131 may use a decision-tree based classification to identify and report stale/non-stale SDN component configurations with indicated levels of confidence for staleness using as input the correlation export JSON file that contains configuration DNA strands and associated attributes. An example of a decision-tree classification based on two attributes, reference count (level 1) and path length (level 2) is shown in FIG. 12.

Figure 12:
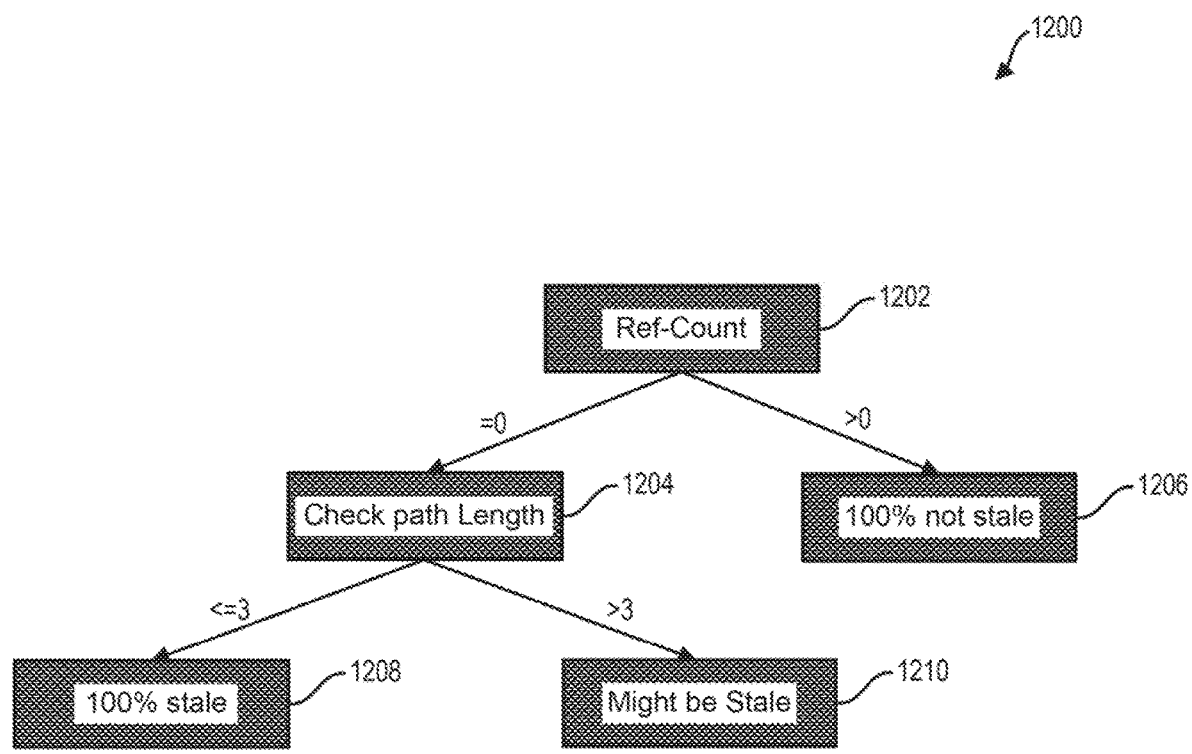
FIG. 12 shows a decision tree that can be used for staleness identification in accordance with one embodiment of the invention.

In FIG. 12, a decision tree 1200 is shown with two decision nodes 1202 and 1204, and three leaf nodes 1206, 1208 and 1210. The decision node 1202 is the initial node of the decision tree, which make a decision based on the reference count of a configuration DNA strand of interest. If the reference count is zero (0), then the decision path proceeds to the decision node 1204. If the reference count is greater than zero, then the decision path proceeds to the leaf node 1206, which indicates "non-stale with high (100%) confidence." At the decision node 1204, another decision is made based on the path length of the configuration DNA strand of interest. If the path length is less than or equal to a predefined value (e.g., 3 in this example), then the decision path proceeds to the leaf node 1208, which indicates "stale with high (100%) confidence." If the path length is greater than the predefined value (e.g., 3), then the decision path proceeds to the leaf node 1210, which indicates "stale with low confidence." The "stale with low confidence" outcome would be flagged to the user for further consideration. As an example, the user may, based on his/her domain knowledge, re-classify the SDN component configuration as non-stale by, for example, changing the value of the attribute stale strand associated with the configuration DNA strand of interest.

Figure 13A:
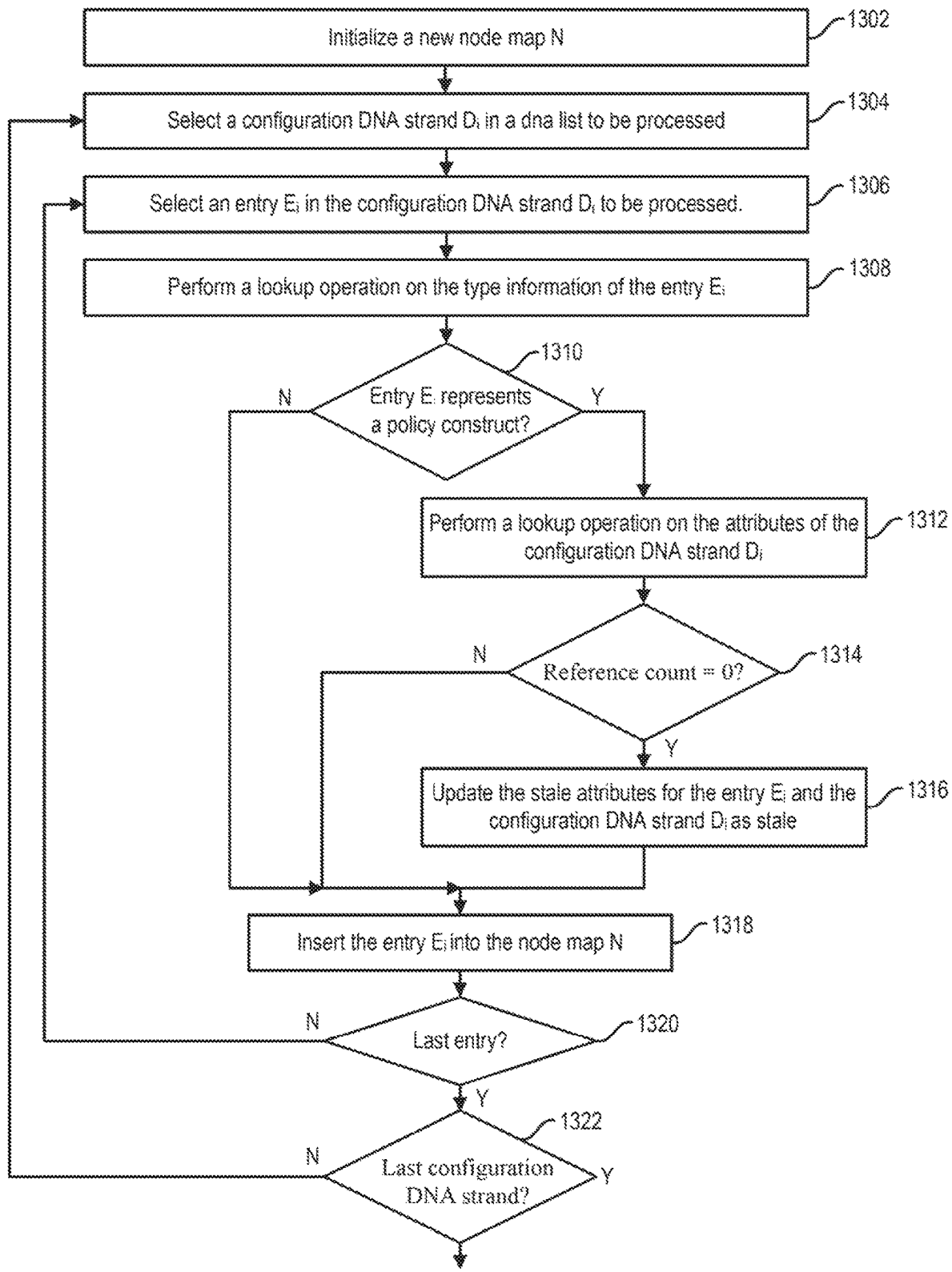
FIGS. 13A, 13B and 13C show a process flow diagram of a staleness identification operation performed by the staleness manager to execute a two-level decision-tree classification to classify the staleness of configuration DNA strands in accordance with an embodiment of the invention.
Figure 13B:
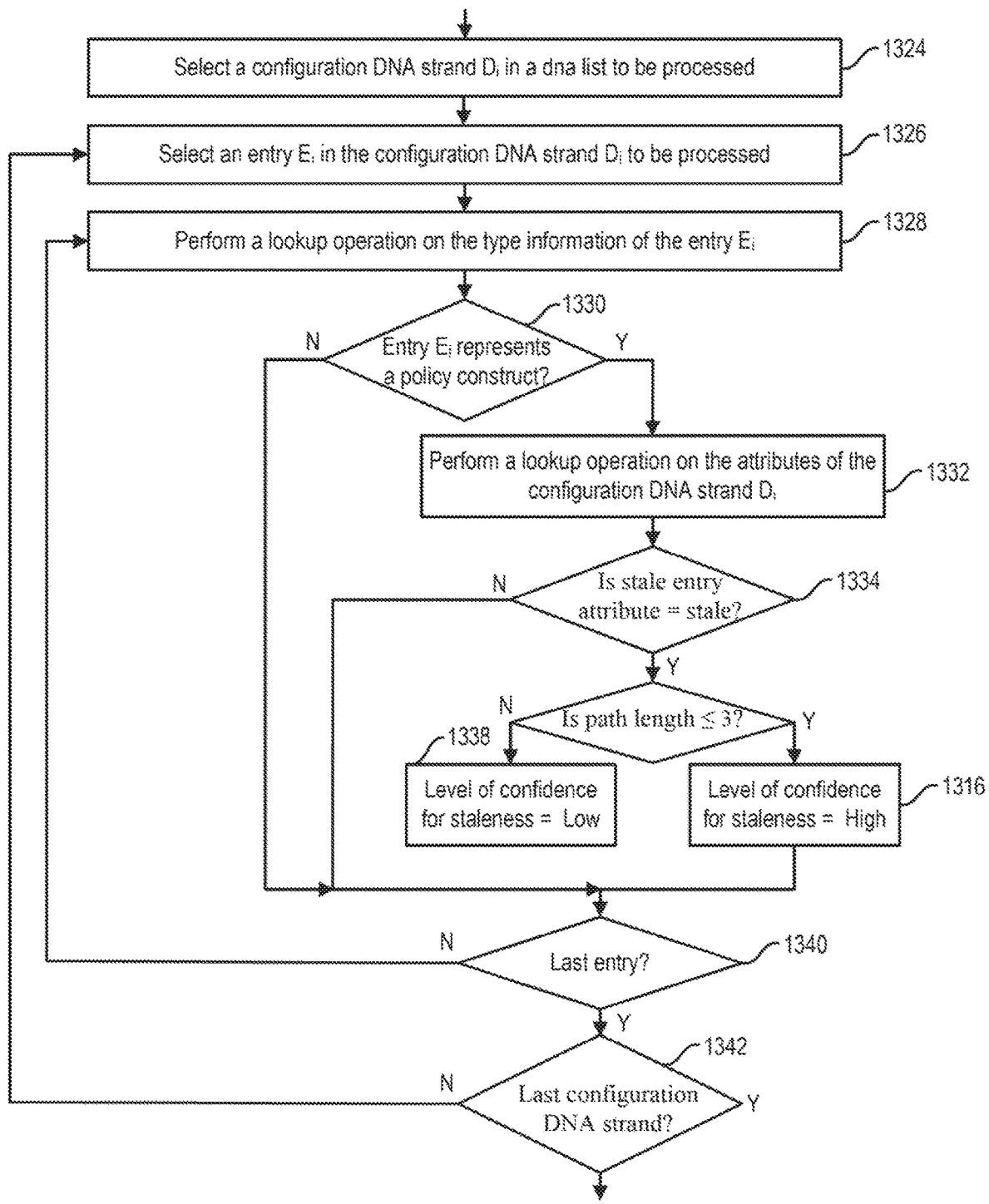
Figure 13C:
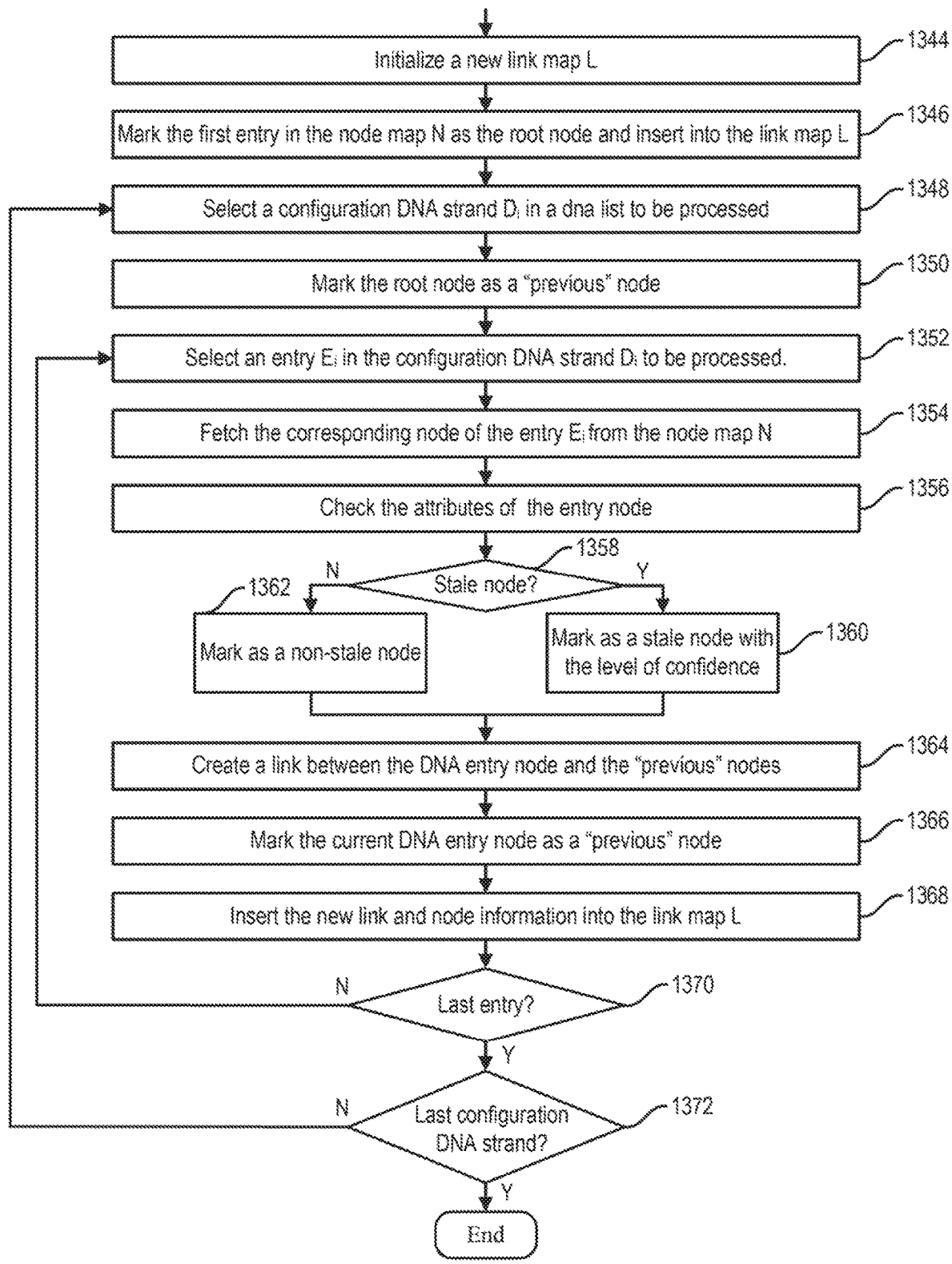

A staleness identification operation performed by the staleness manager 131 to execute a two-level decision-tree classification to classify the staleness of configuration DNA strands in accordance with an embodiment of the invention is described with reference to a process flow diagram of FIG. 13. In this embodiment, the operation is executed in three passes. However, in other embodiments, the operation may be executed in different number of passes.

The first pass results in the first level classification of configurations based on reference count. The first pass involves blocks 1302-1322. At block 1302, a new node map N is initialized. The node map N will include all the configuration DNA strands with nodes for an SDN component of interest. Next, at block 1304, a configuration DNA strand $D_i$ in a dna list for the SDN component is selected to be processed. Next, at block 1306, an entry $E_i$ in the configuration DNA strand $D_i$ is selected to be processed. Next, at block 1308, a lookup operation on the type information of the entry $E_i$ is performed.

Next, at block 1310, a determination is made whether the entry $E_i$ represents a policy construct (for example, a firewall or a NAT rule). If no, then the operation proceeds to block 1318. If yes, then the operation proceeds to block 1312, where a lookup operation on the attributes of the configuration DNA strand $D_i$ is performed.

Next, at block 1314, a determination is made whether the reference count attribute of the configuration DNA strand $D_i$ is equal to zero. If yes, then the operation proceeds to block 1316, where the stale entry attribute for the entry $E_i$ and the stale strand attribute of the configuration DNA strand $D_i$ are updated to signify that the configuration DNA entry and the configuration DNA strand $D_i$ are stale. The level of confidence for the staleness will be entered during the second pass. The operation then proceeds to block 1318. However, if no (reference count is greater than 0), then the operation proceeds directly to block 1318. It is assumed here that the stale entries for all configuration DNA strands and all DNA entries are initially set as "not stale."

At block 1318, the entry $E_i$ is inserted into the node map N. Next, at block 1320, a determination is made whether the current entry $E_i$ is the last entry for the configuration DNA strand $D_i$. If no, then the operation proceeds back to block 1306, where another entry in the configuration DNA strand $D_i$ is selected to be processed. If yes, then the operation proceeds to block 1322, where a determination is made whether the current configuration DNA strand $D_i$ is the last configuration DNA strand. If no, then the operation proceeds back to block 1304, where another configuration DNA strand in the dna list is selected to be processed. If yes, the operation proceeds to block 1324, where the second pass begins.

The second pass results in the second level classification of the configurations based on path lengths. The second pass involves blocks 1324-1342. At block 1324, a configuration DNA strand $D_i$ in the dna list for the SDN component is selected to be processed. At block 1326, an entry $E_i$ in the configuration DNA strand $D_i$ is selected to be processed. Next, at block 1328, a lookup operation on the type information of the entry $E_i$ is performed.

Next, at block 1330, a determination is made whether the entry $E_i$ represents a policy construct. If no, then the operation proceeds to block 1340. If yes, then the operation proceeds to block 1332, where a lookup operation on the attributes of the configuration DNA strand $D_i$ is performed.

Next, at block 1334, a determination is made whether the stale entry attribute of the entry $E_i$ is stale. If no, then the operation proceeds to block 1340. If yes, then the operation proceeds to block 1336, where a determination is made whether the path length of the configuration DNA strand $D_i$ is equal to or less than a predefined value (in this example, the predefined value is 3). If yes, then the operation proceeds to block 1336, where the stale entry attribute for the entry $E_i$ and the stale strand attribute of the configuration DNA strand $D_i$ are updated to indicate that the level of confidence for the staleness is a high confidence (e.g. 100%). If no, then the operation proceeds to block 1338, where the stale entry attribute for the entry $E_i$ and the stale strand attribute of the configuration DNA strand $D_i$ are updated to indicate that the level of confidence for the staleness is a low confidence. The operation then proceeds to block 1340.

Next, at block 1340, a determination is made whether the current entry $E_i$ is the last entry for the configuration DNA strand $D_i$. If no, then the operation proceeds back to block 1326, where another entry in the configuration DNA strand $D_i$ is selected to be processed. If yes, then the operation proceeds to block 1342, where a determination is made whether the current configuration DNA strand $D_i$ is the last configuration DNA strand. If no, then the operation proceeds back to block 1324, where another configuration DNA strand in the dna list is selected to be processed. If yes, the operation proceeds to block 1344, where the third pass begins.

The third pass results in a depiction of the stale rules in a human readable format. The third pass involves blocks 1344-1372. At block 1344, a new link map L is initialized. Next, at block 1346, the first entry in the node map N is marked as the root node and inserted into the link map L.

At block 1348, a configuration DNA strand $D_i$ in the dna list for the SDN component is selected to be processed. Next, at block 1350, the root node is marked as a "previous" node. Next, at block 1352, a DNA entry $E_i$ of the configuration DNA strand $D_i$ is selected to be processed. Next, at block 1354, the corresponding node of the DNA entry $E_i$ from the node map N is fetched. Next, at block 1356, the attributes of the DNA entry node are checked.

Next, at block 1358, a determination is made whether the current DNA entry node is a stale node. If yes, then the DNA entry node is marked as such along with the level of confidence (e.g., in percentage), at block 1360. If no, then then the DNA entry node is marked as a non-stale node, at block 1362. In an embodiment, for visual graphs, the staleness manager 131 may present the node information in a user interface with different colors. As an example, a node that is determined to be "non-stale with high (100%) confidence" may be presented in green, while a node that is determined to be "stale with high (100%) confidence" may be presented in red. A node that is determined to be "stale with low confidence" may be presented in yellow.

Next, at block 1364, a link between the current DNA entry node and the "previous" nodes is created. Next, at block 1366, the current DNA entry node is marked as a "previous" node. Next, at block 1368, the new link and node information are inserted into the link map L.

Next, at block 1370, a determination is made whether the current entry $E_i$ is the last entry for the configuration DNA strand $D_i$. If no, then the operation proceeds back to block 1352, where another entry in the configuration DNA strand $D_i$ is selected to be processed. If yes, then the operation proceeds to block 1372, where a determination is made whether the current configuration DNA strand $D_i$ is the last configuration DNA strand. If no, then the operation proceeds back to block 1348, where another configuration DNA strand in the dna list is selected to be processed. If yes, then the operation comes to an end.

Figure 14:
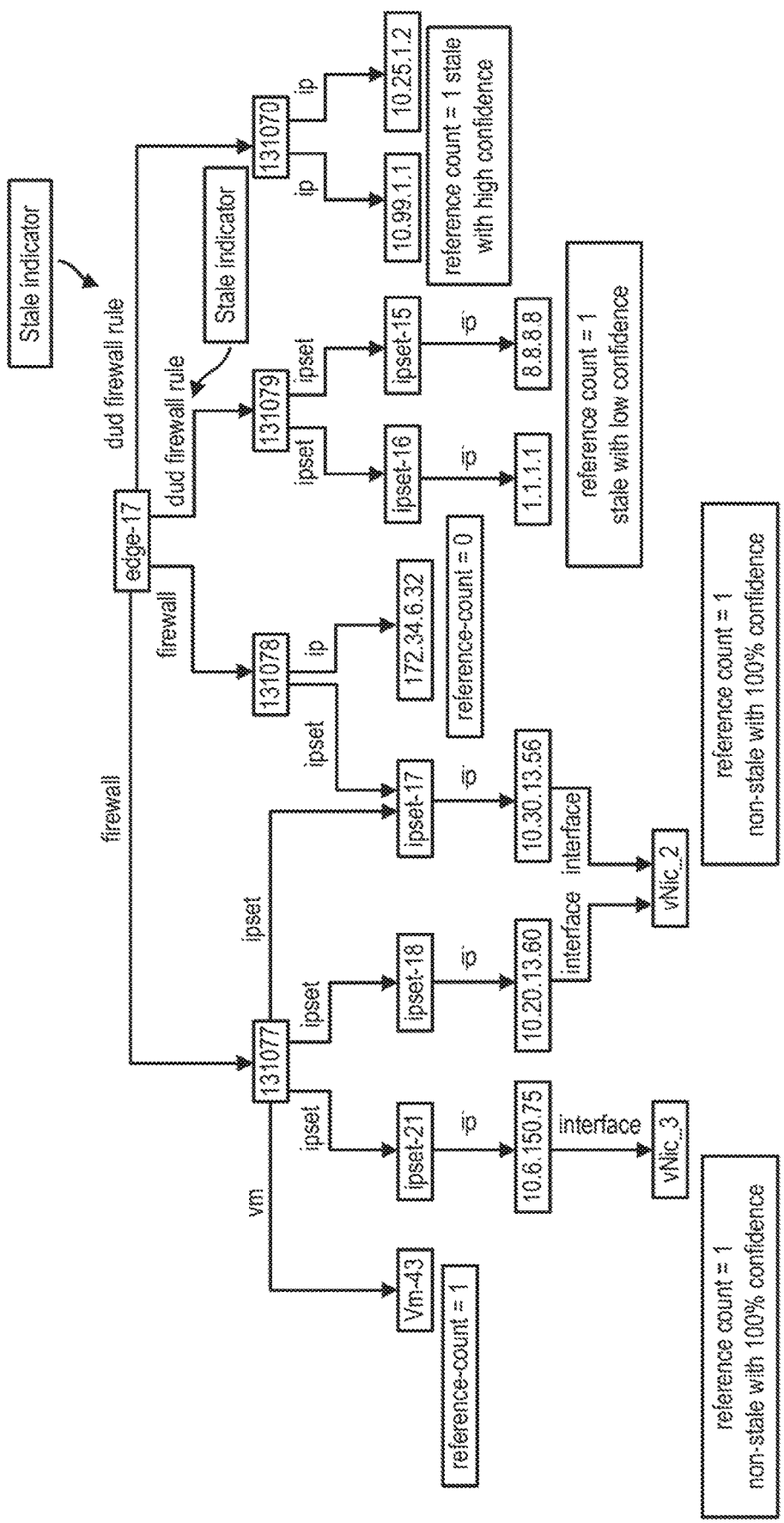
FIG. 14 is a graphical representation of the output from the staleness identification operation in accordance with an embodiment of the invention.

An example of a graphical representation of the output from the staleness identification operation is illustrated in FIG. 14. As shown in FIG. 14, in this graphical representation, reference counts for various end nodes can be presented. In addition, nodes that are stale may be presented in red or yellow, depending on their levels of confidence. In contrast, nodes that are non-stale may be presented in green. In some embodiments, rather than a graphical representation, the output from the operation may be presented in textual format.

While the staleness identification operation described herein uses just two attributes, the staleness identification operation is not restricted to the two attributes. Decision-tree based classification, in general, can take any attribute as it may seem necessary, based on the partial outcomes, as the staleness identification operation is in progress. In other embodiments, the staleness identification operation may use additional attributes, thereby adding more levels (or depth) to the classifications.

In some embodiments, machine-learning tools (decision tree and/or random-forest) may be employed to (a) dynamically add/remove attributes based on mathematical evaluations (e.g., "entropy", "information gain", "Gini index", to name a few), (b) dynamically learn the threshhold value at any level of classification and determining of the confidence level, and (c) take user inputs or corrections (user overridden classifications) as feedback for learning to better the decision tree by, for example, employing known techniques.

Figure 15:
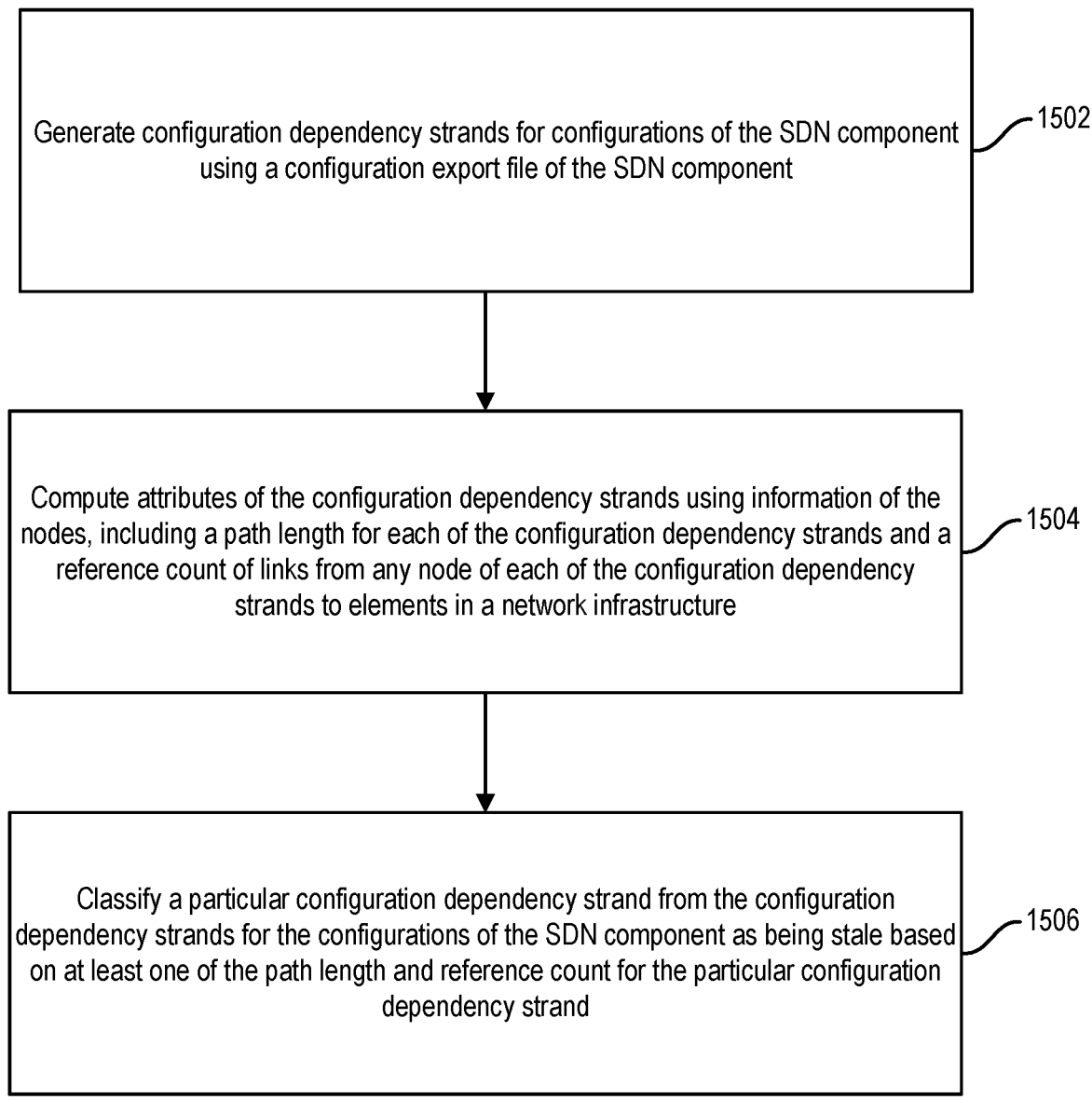
FIG. 15 is a process flow diagram of a computer-implemented method for identifying stale configurations of a software-defined network (SDN) component in accordance with an embodiment of the invention.

A computer-implemented method for identifying stale configurations of a software-defined network (SDN) component in accordance with an embodiment of the invention is described with reference to a flow diagram of FIG. 15. At block 1502, configuration dependency strands for configurations of the SDN component are generated using a configuration export file of the SDN component. The configuration dependency strands include nodes for correlation keys defined in the configuration export file, which includes information to configure the SDN component in a computing environment. At block 1504, attributes of the configuration dependency strands are computed using information of the nodes, including a path length for each of the configuration dependency strands and a reference count of links from any node of each of the configuration dependency strands to elements in a network infrastructure. At block 1506, a particular configuration dependency strand from the configuration dependency strands for the configurations of the SDN component is classified as being stale based on at least one of the path length and reference count for the particular configuration dependency strand.

Although some of the embodiments of the invention have been described as being applied to a hybrid cloud environment, various embodiments of the invention can be applied to multi-cloud environment since the dictionary can be trained to consume keywords from respective cloud-native APIs.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for identifying stale configurations of a software-defined network (SDN) component, the method comprising:
    generating configuration dependency strands for configurations of the SDN component using a configuration export file of the SDN component, the configuration dependency strands including nodes for correlation keys defined in the configuration export file, the configuration export file including information to configure the SDN component in a computing environment;
    computing attributes of the configuration dependency strands using information of the nodes, including a path length for each of the configuration dependency strands and a reference count of links from any node of each of the configuration dependency strands to elements in a network infrastructure; and
    classifying a particular configuration dependency strand from the configuration dependency strands for the configurations of the SDN component as being stale based on at least one of the path length and reference count for the particular configuration dependency strand.

2. The computer-implemented method of claim 1, wherein classifying the particular configuration dependency strand from the configuration dependency strands for the configurations of the SDN component as being stale includes classifying the particular configuration dependency strand from the configuration dependency strands for the configurations of the SDN component as being stale when the reference count for the particular configuration dependency strand is zero.

3. The computer-implemented method of claim 2, further comprising assigning a level of confidence for the identification of the particular configuration dependency strand being stale based on the path length and/or a custom designated attribute of the particular configuration dependency strand.

4. The computer-implemented method of claim 3, wherein assigning a level of confidence for the identification of the particular configuration dependency strand being stale includes assigning a high level of confidence when the path length of the particular configuration dependency strand is equal to or less than a value and assigning a low level of confidence when the path length of the particular configuration dependency strand is greater than the value, or vice versa.

5. The computer-implemented method of claim 1, wherein classifying the particular configuration dependency strand from the configuration dependency strands for the configurations of the SDN component as being stale includes classifying the particular configuration dependency strand from the configuration dependency strands for the configurations of the SDN component as being stale using a multilevel decision-tree based classification process.

6. The computer-implemented method of claim 1, wherein classifying the particular configuration dependency strand from the configuration dependency strands for the configurations of the SDN component as being stale includes classifying a particular node in the particular configuration dependency strand as being stale based on at least one of the path length, the reference count and a custom attribute for the particular configuration dependency strand.

7. The computer-implemented method of claim 6, further comprising displaying the particular node in a particular color to indicate that the particular node has been identified as being stale with an indicated level of confidence.

8. The computer-implemented method of claim 1, wherein the configuration export file is a Java Script Object Notification (JSON) file.

9. A non-transitory computer-readable storage medium containing program instructions for determining stale configurations of a software-defined network (SDN) component, wherein execution of the program instructions by one or more processors of a computer system causes the one or more processors to perform steps comprising:
    generating configuration dependency strands for configurations of the SDN component using a configuration export file of the SDN component, the configuration dependency strands including nodes for correlation keys defined in the configuration export file, the configuration export file including information to configure the SDN component in a computing environment;
    computing attributes of the configuration dependency strands using information of the nodes, including a path length for each of the configuration dependency strands and a reference count of links from any node of each of the configuration dependency strands to elements in a network infrastructure; and
    classifying a particular configuration dependency strand from the configuration dependency strands for the configurations of the SDN component as being stale based on at least one of the path length and reference count for the particular configuration dependency strand.

10. The non-transitory computer-readable storage medium of claim 9, wherein classifying the particular configuration dependency strand from the configuration dependency strands for the configurations of the SDN component as being stale includes classifying the particular configuration dependency strand from the configuration dependency strands for the configurations of the SDN component as being stale when the reference count for the particular configuration dependency strand is zero.

11. The non-transitory computer-readable storage medium of claim 10, wherein the steps further comprise assigning a level of confidence for the identification of the particular configuration dependency strand being stale based on the path length and/or a custom designated attribute of the particular configuration dependency strand.

12. The non-transitory computer-readable storage medium of claim 11, wherein assigning a level of confidence for the identification of the particular configuration dependency strand being stale includes assigning a high level of confidence when the path length of the particular configuration dependency strand is equal to or less than a value and assigning a low level of confidence when the path length of the particular configuration dependency strand is greater than the value, or vice versa.

13. The non-transitory computer-readable storage medium of claim 9, wherein classifying the particular configuration dependency strand from the configuration dependency strands for the configurations of the SDN component as being stale includes classifying the particular configuration dependency strand from the configuration dependency strands for the configurations of the SDN component as being stale using a multilevel decision-tree based classification process.

14. The non-transitory computer-readable storage medium of claim 9, wherein classifying the particular configuration dependency strand from the configuration dependency strands for the configurations of the SDN component as being stale includes classifying a particular node in the particular configuration dependency strand as being stale based on at least one of the path length, the reference count and a custom attribute for the particular configuration dependency strand.

15. The non-transitory computer-readable storage medium of claim 14, wherein the steps further comprise displaying the particular node in a particular color to indicate that the particular node has been identified as being stale with an indicated level of confidence.

16. The non-transitory computer-readable storage medium of claim 9, wherein the configuration export file is a Java Script Object Notification (JSON) file.

17. A system comprising:
memory; and
at least one processor configured to:
generate configuration dependency strands for configurations of the SDN component using a configuration export file of the SDN component, the configuration dependency strands including nodes for correlation keys defined in the configuration export file, the configuration export file including information to configure the SDN component in a computing environment;
compute attributes of the configuration dependency strands using information of the nodes, including a path length for each of the configuration dependency strands and a reference count of links from any node of each of the configuration dependency strands to elements in a network infrastructure; and
classify a particular configuration dependency strand from the configuration dependency strands for the configurations of the SDN component as being stale based on at least one of the path length and reference count for the particular configuration dependency strand.

18. The system of claim 17, wherein the at least one processor is configured to classify the particular configuration dependency strand from the configuration dependency strands for the configurations of the SDN component as being stale when the reference count for the particular configuration dependency strand is zero.

19. The system of claim 18, wherein the at least one processor is configured to assign a level of confidence for the identification of the particular configuration dependency strand being stale based on the path length and/or a custom designated attribute of the particular configuration dependency strand.

20. The system of claim 19, wherein the at least one processor is configured to assign a high level of confidence when the path length of the particular configuration dependency strand is equal to or less than a value and assign a low level of confidence when the path length of the particular configuration dependency strand is greater than the value, or vice versa.

* * * * *